Dec. 20, 1960    R. M. HAYES ET AL    2,965,019
CARD PROCESSING APPARATUS
Filed Nov. 26, 1956
11 Sheets-Sheet 8
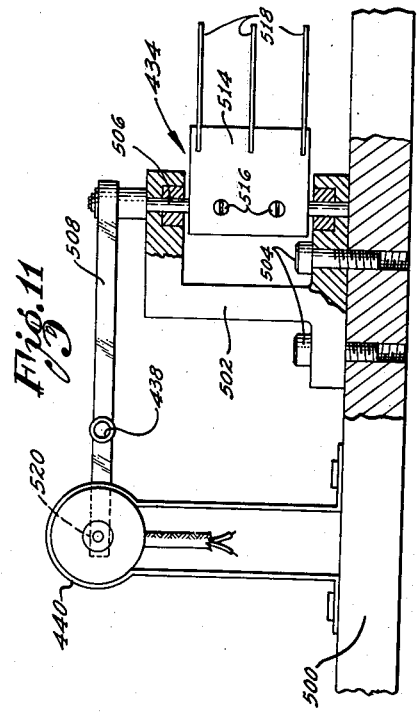
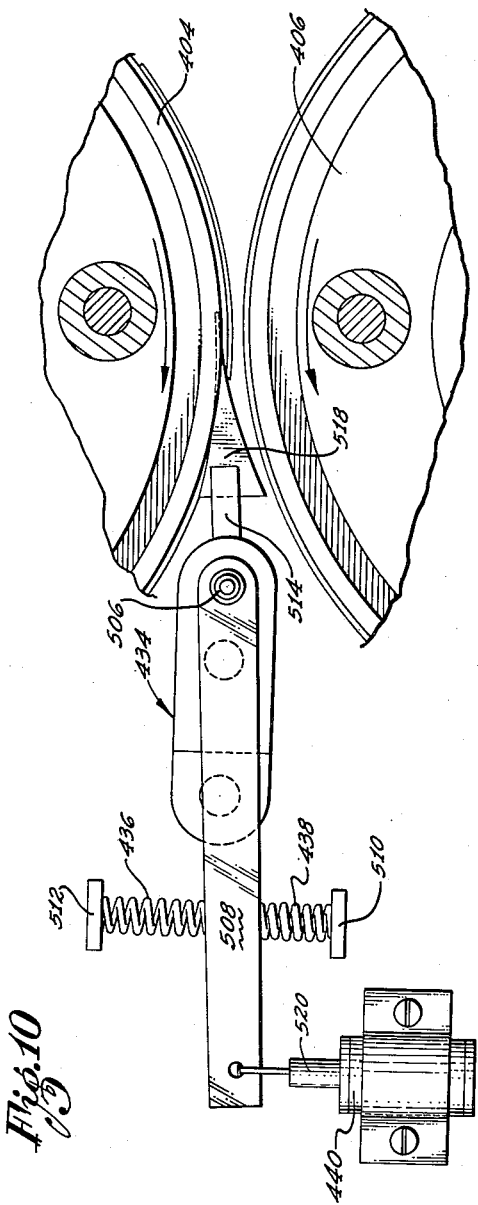
INVENTORS:
Robert M. Hayes
George W. Moyle
By Smyth & Roston
Attorneys

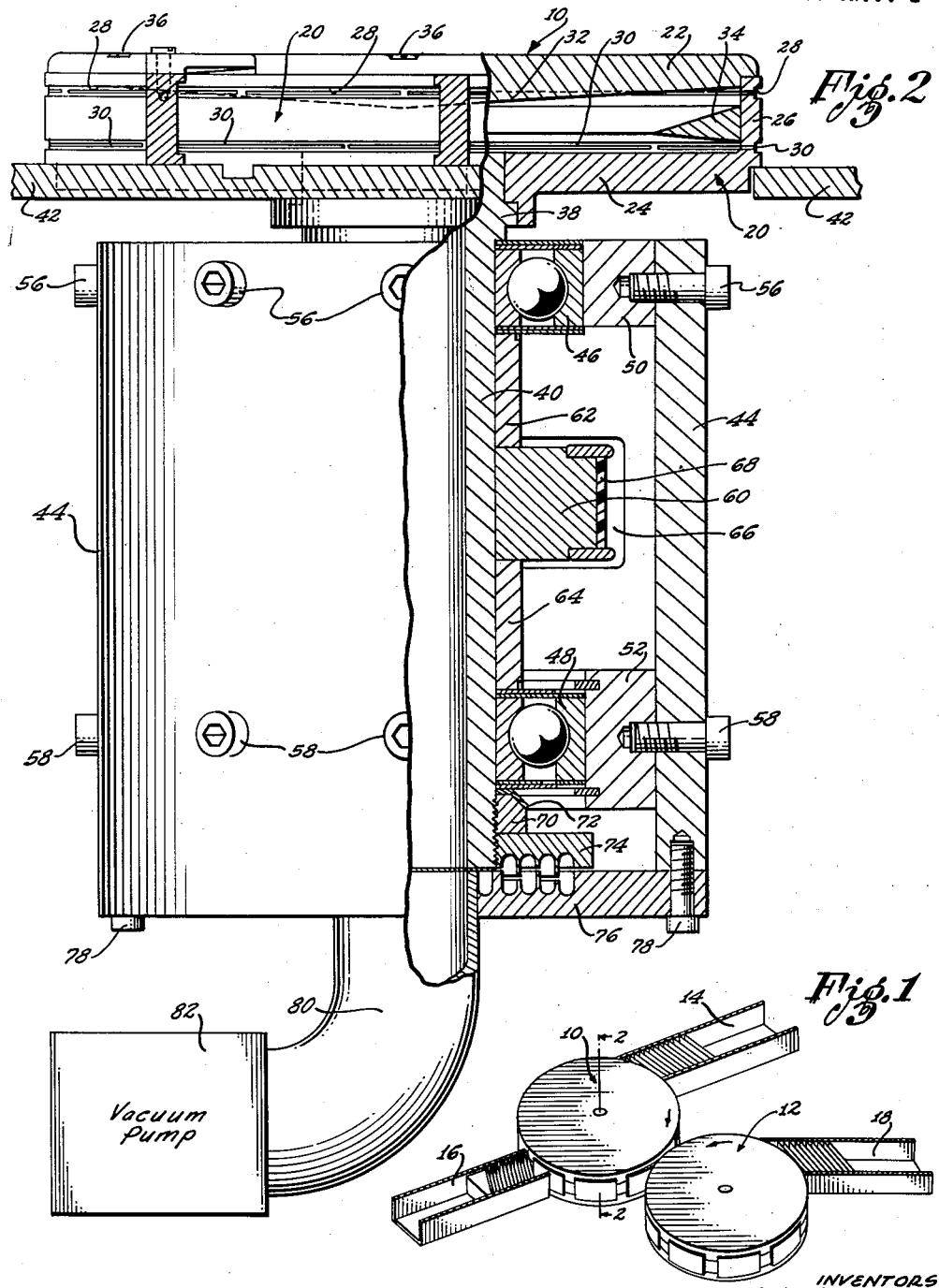

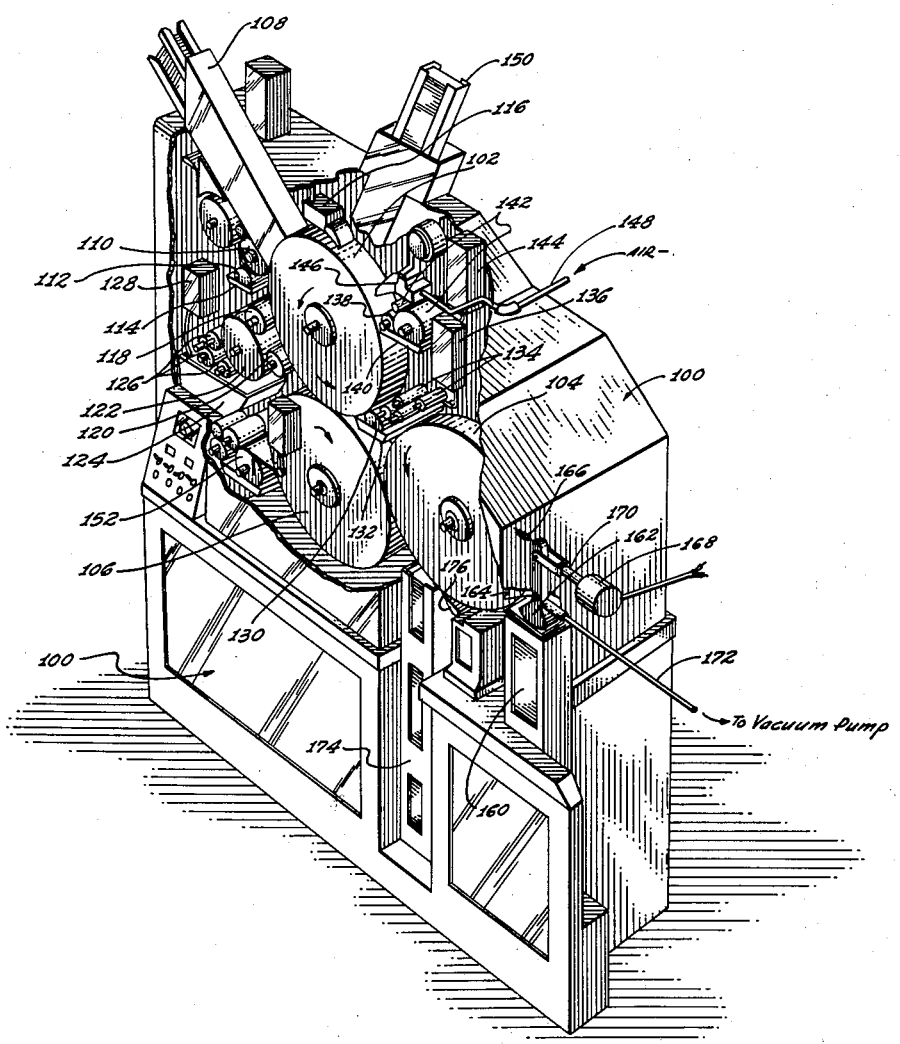

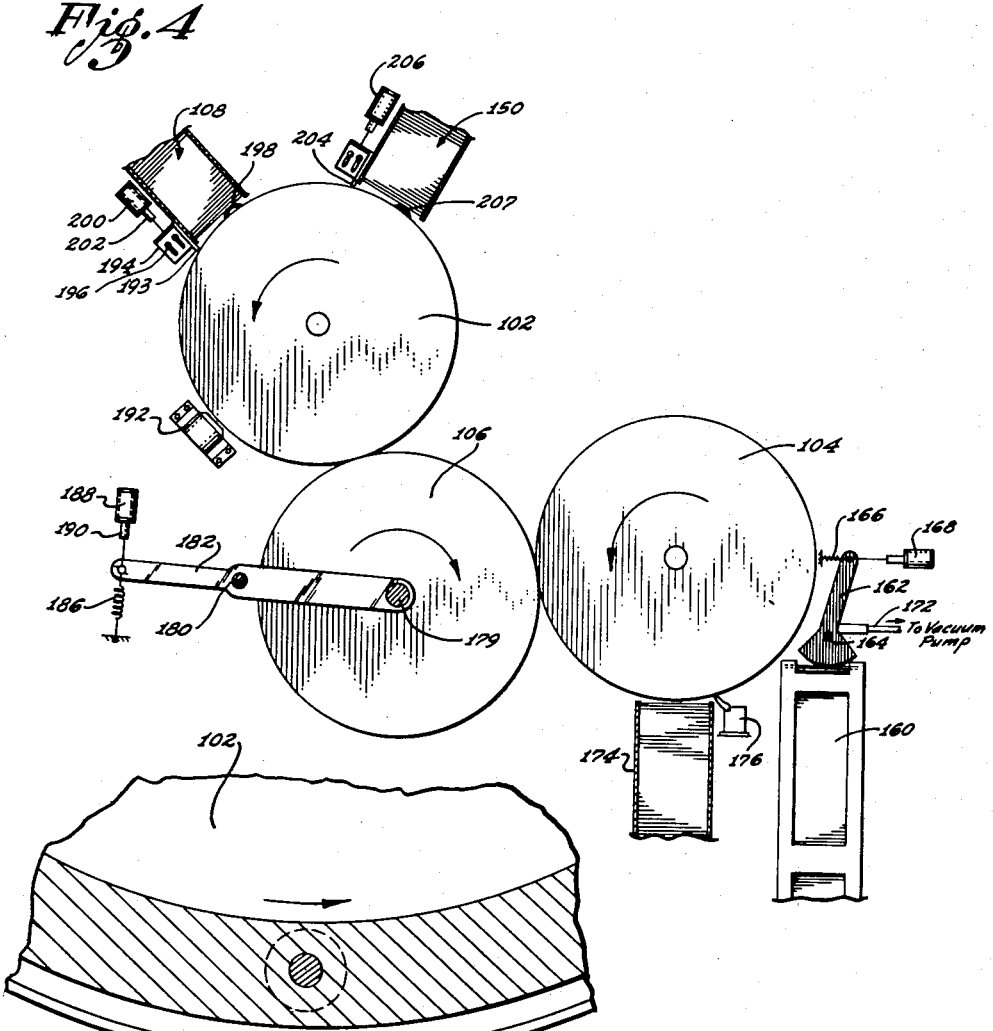
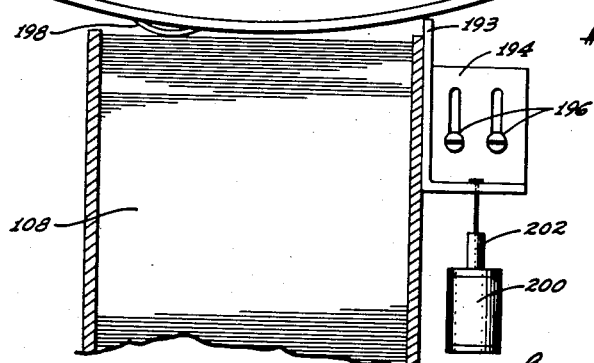

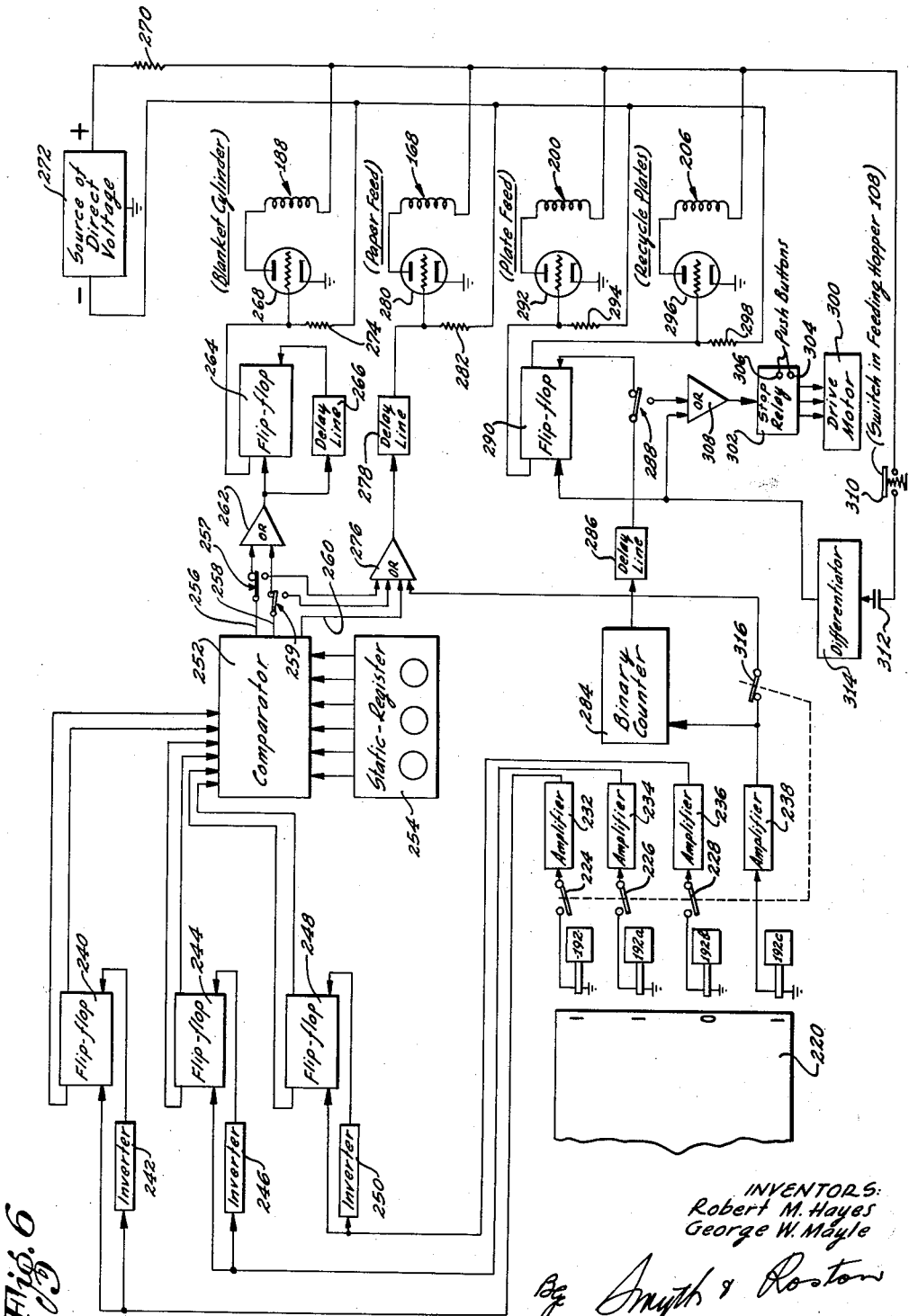

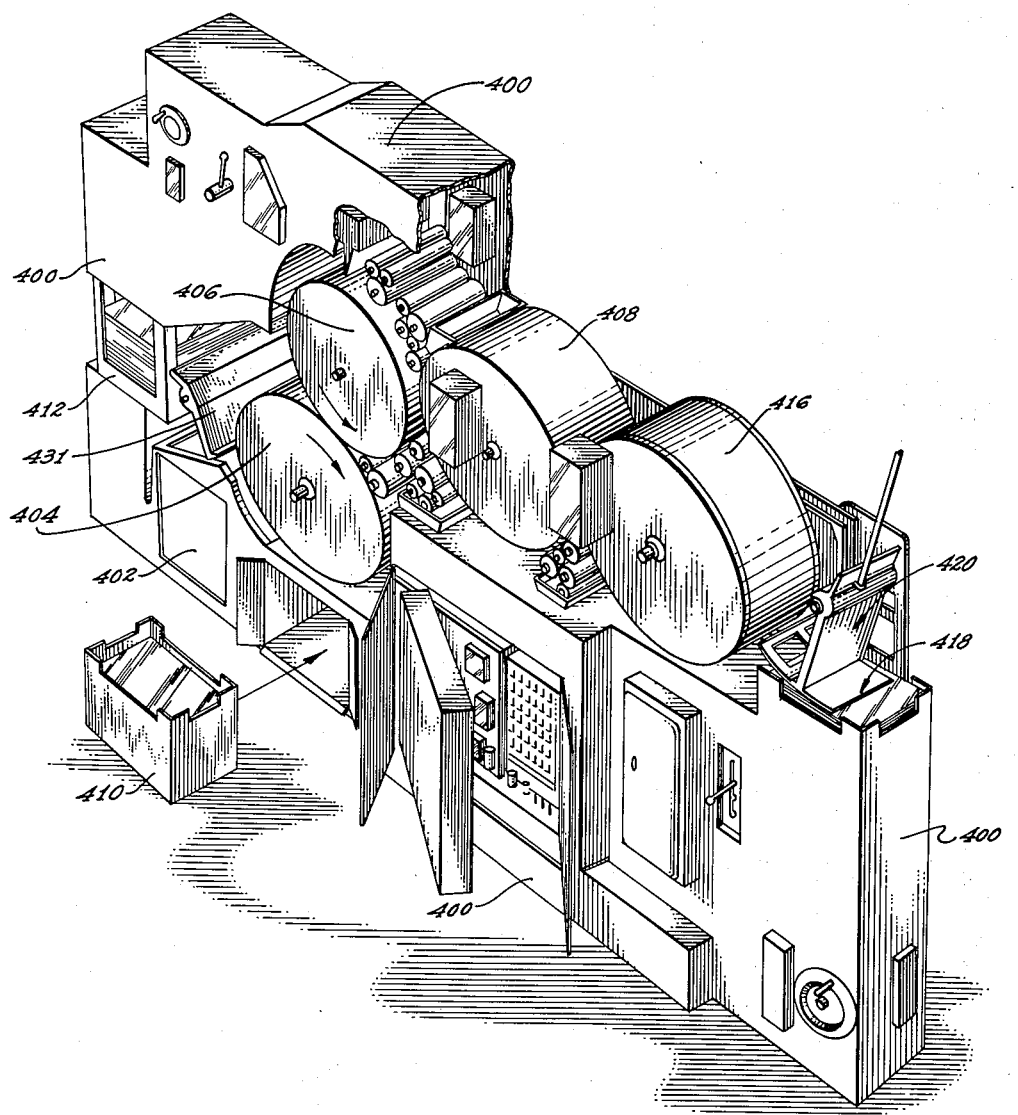

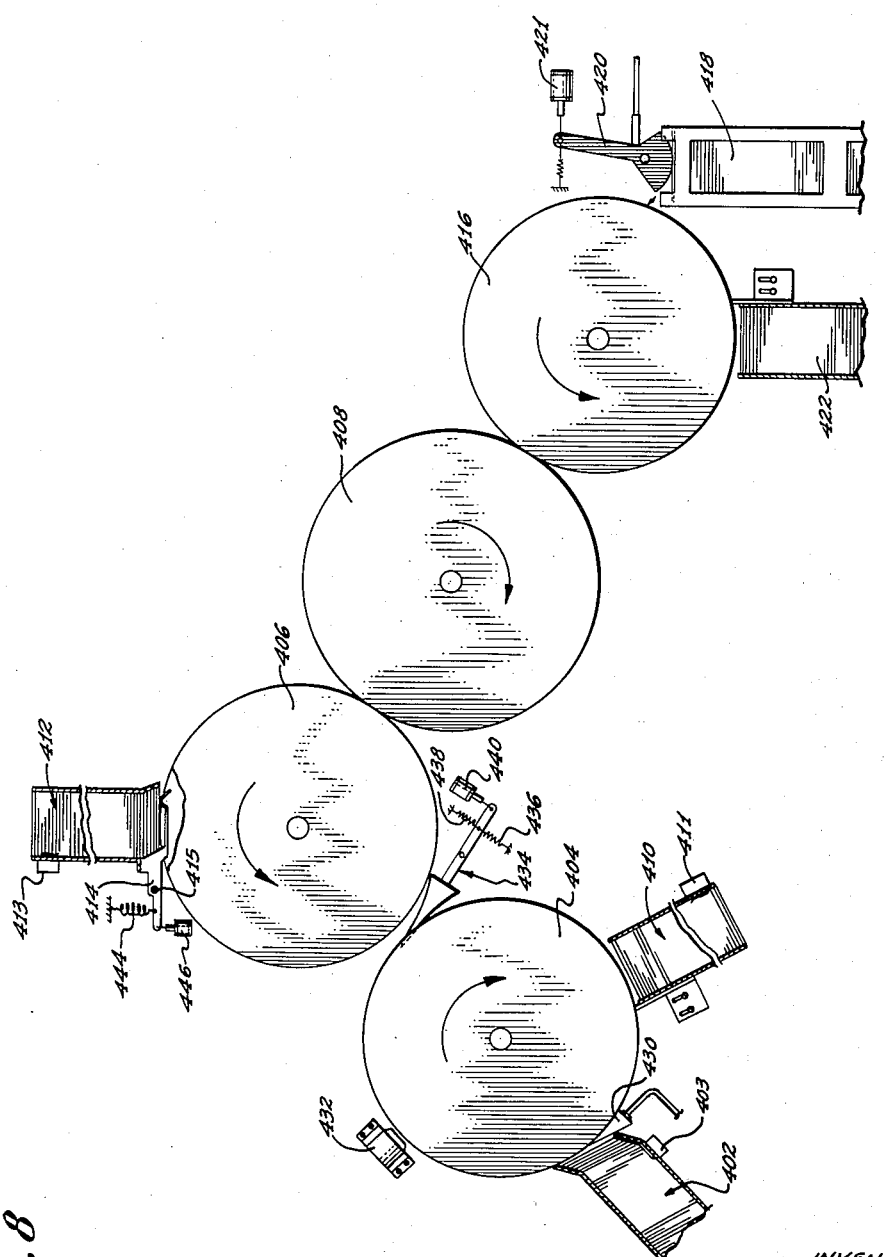

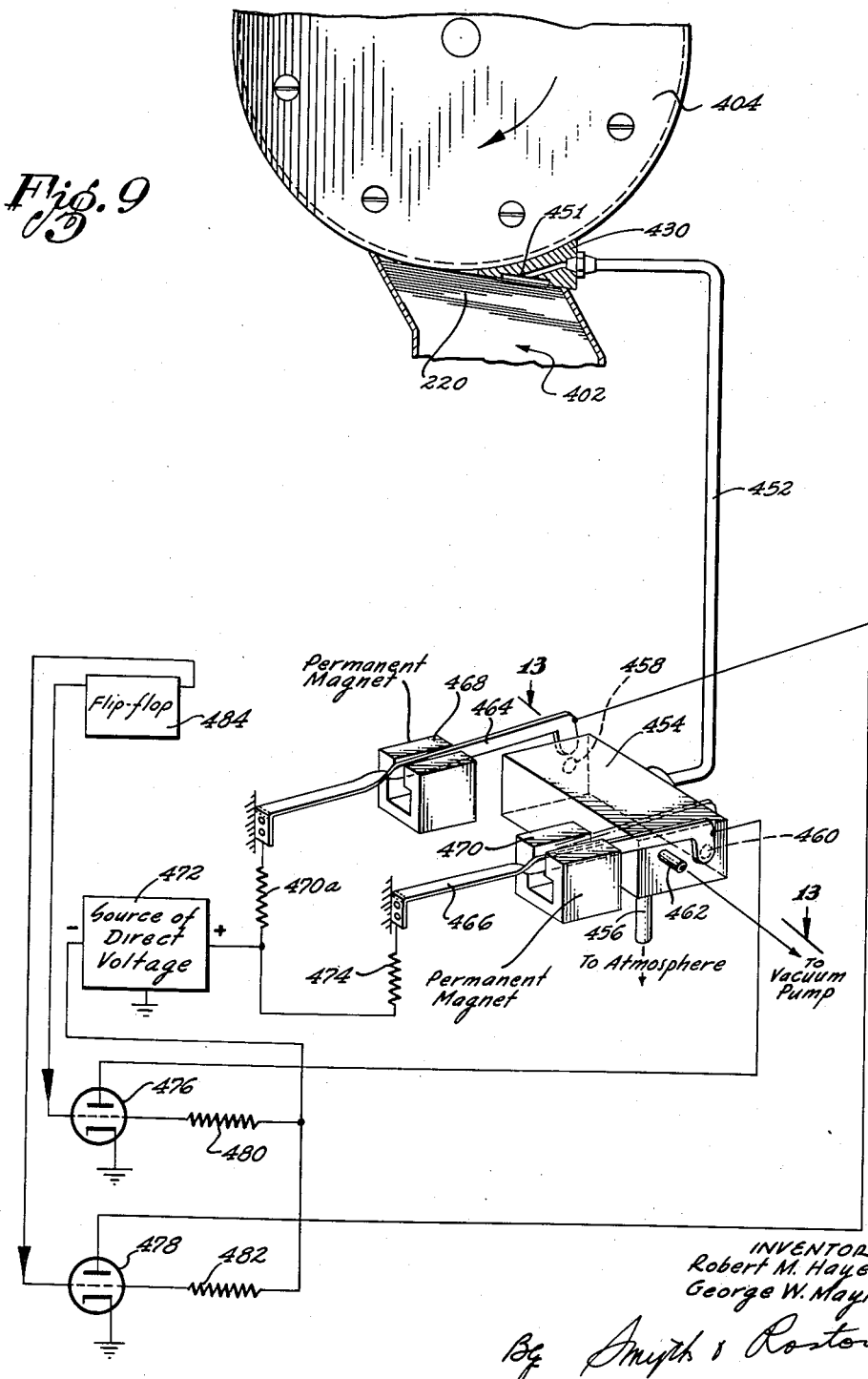

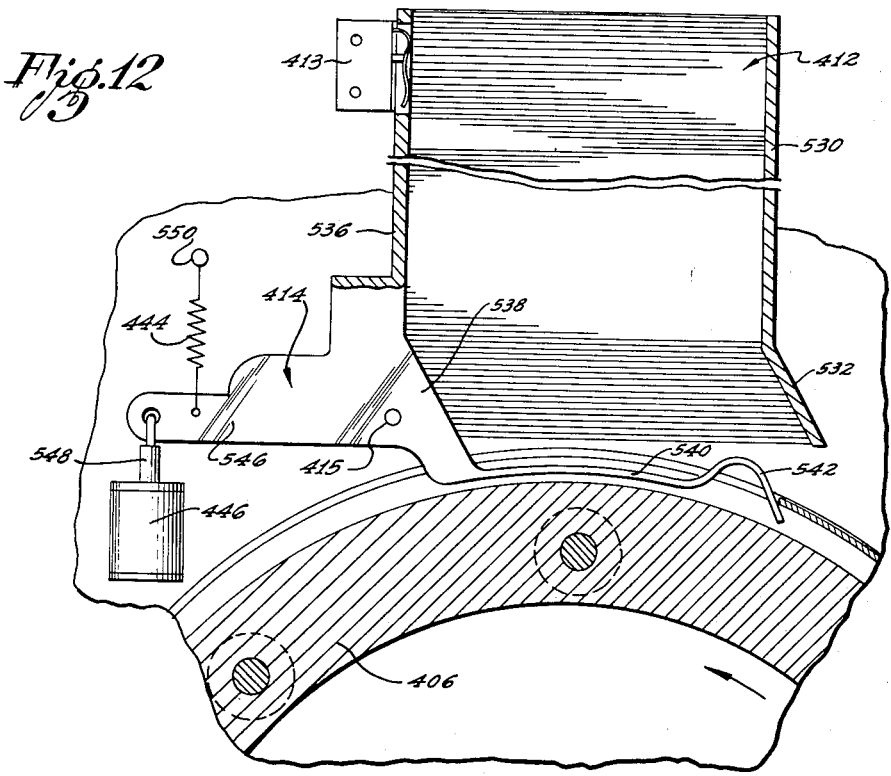

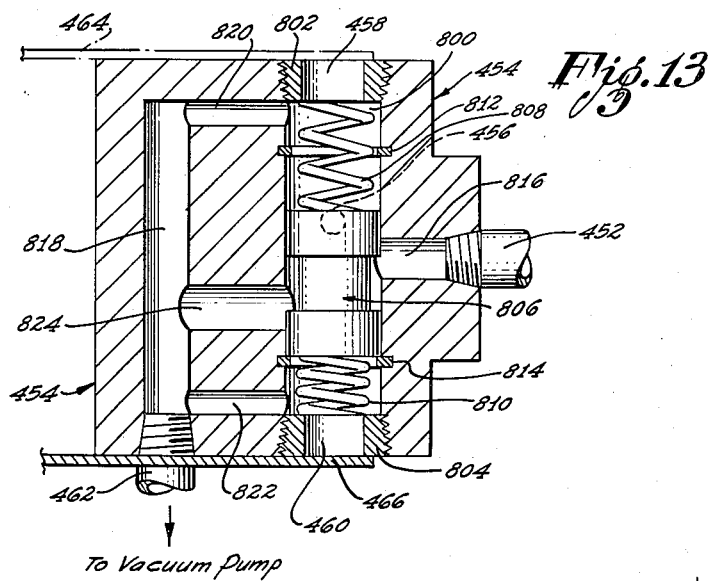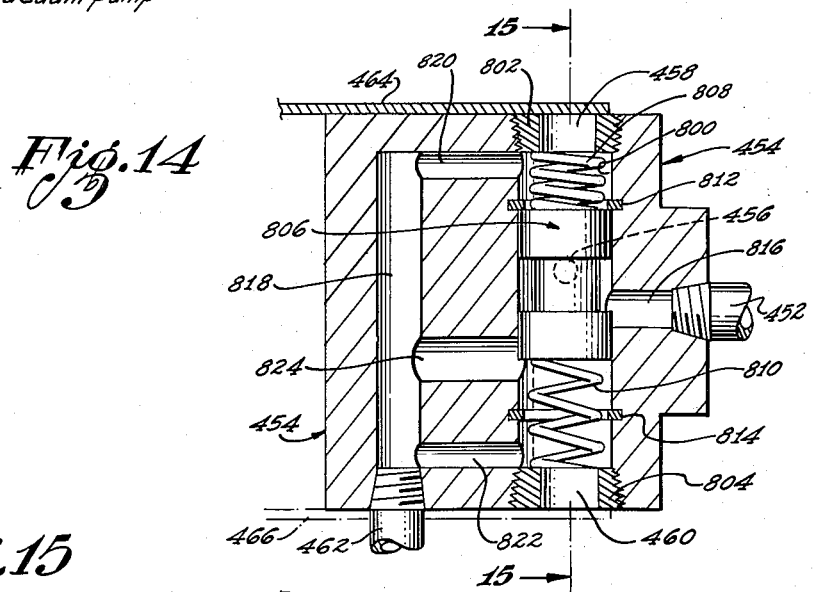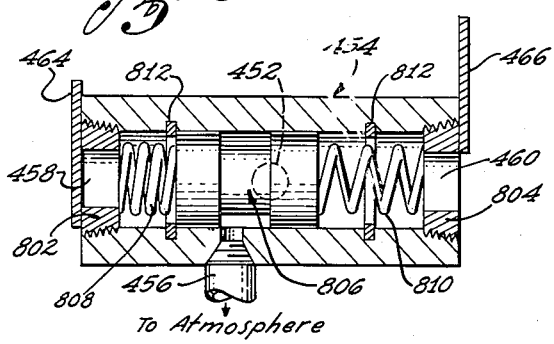

2,965,019

CARD PROCESSING APPARATUS

Robert M. Hayes, Los Angeles, and George W. Mayle, Canoga Park, Calif., assignors to Magnavox Company, Los Angeles, Calif., a corporation of Delaware Filed Nov. 26, 1956, Ser. No. 624,269

24 Claims. (Cl. 101—53)

The invention relates to data processing systems and the like and the invention is directed more particularly to an improved data processing system that is capable of automatically and selectively duplicating stored information in printed form.

The basic function of data handling and processing systems is the storing and analyzing of data which has been fed into the system. The systems must be able with a minimum of time delay to render available any particular desired portion of such data. That is, after the data has been stored, the system must operate quickly and accurately to select any desired portion of the stored data and to make such portion readily available. After information concerning desired portions of the selected data has been obtained, it is usually desirable to disseminate such information to one or more individuals. The best way to accomplish this purpose is to provide for the desired information to be supplied by the data processing system in printed form, and with as many duplicates as desired.

A major purpose of the present invention is to provide a system and apparatus that will adequately and efficiently fill the requirements outlined in the preceding paragraph. More specifically, the system and apparatus of the invention is intended to fill the need both in government and business operations for data processing systems in which the data stored in the system is made readily and quickly available, and that such data be supplied by the system directly in printed form with as many duplicates as may be desired.

The apparatus and system of the invention are eminently suited, for example, for utilization in fields in which it is desired to maintain a large file index of data pertinent to any particular field of operations and in which duplications of either the entire file or of selected portions of the file are required from time to time. A particular example of such a use is in a magazine distributing center. In a center of this type, the apparatus of the invention is capable of successively selecting a plurality of discrete master plates from a file in which the plates are stored, and of feeding the plates successively to a printing station. The plates may then be used at the printing station automatically to address the wrappers for the magazines.

The apparatus of the invention can also be conveniently used to replace the existing card file systems in libraries, insurance offices, police stations, the Federal Bureau of Investigation headquarters, and in other organizations requiring extensive reference files.

In accordance with one concept of the invention, data is stored in a data processing system in the form of images or impressions on a multiplicity of discrete master printing plates, or on any other suitable medium from which printed duplicates may be made. Individual ones of these masters may be automatically selected by the system in accordance with the data desired at any particular time, and the system functions to produce as many printed duplicates of the selected masters as may be desired.

The apparatus of the present invention is predicated to some extent on vacuum transport principles, such as are described in conjunction with the system and apparatus disclosed and claimed in copending application Serial No. 550,296, filed December 1, 1955, in the name of Alfred M. Nelson et al. The vacuum transport apparatus described in the copending application includes a plurality of coacting rotatable drums which are disposed in uniplanar relation for rotation about displaced parallel axes. In a manner to be described, vacuum pressure is created at the peripheral surface of each drum. This vacuum pressure enables the drums to support and transport the master plates on their peripheral surface.

In one embodiment of the invention, the images on all the master plates are impressioned without selection or discrimination on a rotating blanket drum, and each of such impressions is subsequently printed on a corresponding discrete sheet of impression paper. Such an arrangement is capable of providing a succession of single duplicates of the master plates stored in the system. A suitable control can be incorporated in this embodiment, however, so that certain desired ones only of the master plates are selected and duplicates are made of the selected plates only.

In accordance with another embodiment of the invention, electronically controlled gates are provided for transferring the master plates from the peripheral surface of one transport drum to the peripheral surface of another. Transducer heads are positioned adjacent to the drums to process identifying data recorded on the plates, and this data is utilized in the control of the gates.

The identifying data is, preferably, recorded in magnetic form with one magnetic polarity representing, for example, the integer "1" and with the opposite magnetic polarity representing the integer "0." The derived identifying signals from the master plates may correspond, for example, to multiple-digit binary numbers, and these are compared with reference numbers set up manually in the system so as to obtain control signals for the gates. In this manner, the gates may be controlled to enable only certain ones of the master plates to be transferred to a second transport drum and brought by that drum to a printing position.

Further controllable means may also be provided to enable the selected plates to be circulated by the second transport drum a number of times corresponding to the number of duplicates desired. The apparatus of this latter embodiment therefore, enables one or more duplicates to be made of each master plate stored in the system or of selected ones only of the stored plates.

With the equipment described above, a large amount of data may be stored in a plurality of master plates. Moreover, the plates may be readily and rapidly processed in an automatic manner and selected to make any desired portion of the data available. The selected data is printed and, if so desired, as many duplicate copies as are desired may be automatically obtained.

The apparatus of the invention is also capable of producing the desired printed duplications without destroying the original sequence of the master plates. For example, the master plates may all be automatically deposited one after the other in a stacking hopper after they have been processed. Since the plates become stacked in this latter hopper in inverse order as compared with their original sequence, provision is made for automatically recycling the plates to their original feeding hopper at the end of each selection so as to restore their original sequence.

Other embodiments of the invention provide for the physical separation of the master plates, as between those selected at any particular time for duplication and those that are not so selected. This is often convenient in systems in which it is desired that the more active master plates be rendered more readily available than the less active.

It will be evident as the description proceeds that the invention is not limited to any particular printing technique. The particular embodiments of the invention to be described, use the offset-lithographic printing process. However, other printing processes, such as "xerographic" (or dry printing), hectographic, diazo, and so on, may be used. For convenience of description and as noted above, the embodiments of the invention to be described will use the offset-lithographic process. However, it appears at present that the xerographic may prove to be at least as useful. The main advantages of the latter process are that it provides excellent resolution of the duplicates, and almost any written or printed material can be duplicated by the process, which simplifies the preparation of the masters.

In utilizing lithographic principles for the present invention, data is recorded on the discrete master plates in the form of offset positive images. The master plates are fed singly from a feeding hopper to a vacuum transport drum. Each plate is carried by this drum into contact with a second drum which shall be referred to as a "blanket cylinder." The image from each master plate is therefore, transferred to the surface of the blanket cylinder. The master plates then continue around the vacuum transport drum until they reach a stacking hopper.

In one embodiment of the invention, the master plates are either stacked in the stacking hopper, or they are allowed to recirculate around the transport drum, depending upon how many copies are desired. At the same time, sheets of impression paper are successively fed from a paper-feeding hopper onto an associated vacuum transport drum. The impression paper is circulated into contact with the blanket drum, and each sheet receives the image which was impressed on the blanket drum by a corresponding master to provide a printed duplicate of the data on that master. The duplicates are then circulated to and stacked in an appropriate stacking hopper.

The offset master plates are moistened and inked before they are brought into contact with the blanket cylinder. The ink adheres only to the offset positive image of each master. The blanket cylinder has a special covering composed, for example, of rubber; and as it is rolled against the inked offset image of the master plates, the inked image from each master is transferred to its surface as a negative impression. The sheets of impression paper receive these impressions as they are moved by their transport drum against the images on the blanket cylinder.

As noted above, "xerographic" duplicating can also be utilized in practicing the invention. This latter printing is essentially a photo-printing process and the masters are in the form of usual photographic positive transparencies. When this process is used, the surface of the blanket cylinder is positively charged. This charge can be obtained by exposing the drum to a high voltage through a corona discharge apparatus. A light beam is then reflected from each of the master plates to the charged cylinder as the plates are successively brought into position by their transport drum. This causes the charge on the surface of the blanket cylinder to diminish in a localized manner and as a function of the intensity of incident light. A negatively charged powder is then cascaded over the surface of the drum, and this powder adheres to the positively charged areas of the drum and with a density proportional to the varying value of the charge. The powder image is transferred to the impression paper by a corona discharge, and the powder is later fused to the paper so as to provide a positive copy.

It will be evident as the description proceeds that the described embodiments of the present invention may be readily adapted to utilize this type of printing technique.

In the drawings:

Figure 1 is a perspective diagrammatic representation of a vacuum drum transport system illustrating the vacuum transport principles of the present invention;

Figure 2 is an enlarged sectional view substantially on the line 2—2 of Figure 1 and illustrates a vacuum transporting drum with passageways from a hollow drive shaft to its peripheral edge to enable a vacuum pressure to be established at the edge so that master plates, cards, sheets of paper or other items may be retained on the drum for transportation by the drum;

Figure 3 is a perspective view of apparatus constructed in accordance with one embodiment of the invention and which utilizes offset-lithographic printing principles to provide in each operational cycle a single printed duplicate from each of a series of discrete master plates, or from selected ones only of these plates;

Figure 4 is a schematic representation of the apparatus of Figure 1 illustrating the various vacuum transporting drums used used in the apparatus, and also illustrating a control for the blanket cylinder and various feeding and stacking hoppers and their associated transfer mechanisms;

Figure 5 is an enlarged fragmentary view of a stacking hopper used for receiving master plates from a vacuum pressure transporting drum and also illustrates an automatically controllable stop mechanism for converting the stacking hopper to a feeding hopper so as to permit the master plates to be recirculated to their original feeding hopper;

Figure 6 is a circuit diagram of a control system for the embodiment of the invention shown in Figure 3, this diagram being largely in block form because most of its components are in themselves known;

Figure 7 is a perspective view of a second embodiment which also uses offset-lithographic printing principles, this latter embodiment being capable of producing one or more duplicates of the offset images on selected ones of the masters;

Figure 8 is a schematic side elevation of the apparatus of Figure 7 and illustrates various components included in that apparatus and the interrelation between these components;

Figure 9 is a top plan view, partly in section, of a feeder hopper for use in the apparatus of Figures 7 and 8 and a fragment of its associated drum, and of a pneumatically controlled transfer mechanism for the hopper and includes a perspective representation of a control unit for the transfer mechanism and a circuit diagram of a control system for the control unit;

Figures 10 and 11 are top plan and side elevational views, respectively, of a solenoid-controlled gate for use in the apparatus of Figures 7 and 8 for transferring the masters from one vacuum transport drum to another, the view of Figure 11 being partly sectional and on a slightly reduced scale with respect to Figure 10;

Figure 12 illustrates a stacking hopper and a solenoid-controlled transfer mechanism associated with that hopper for enabling the masters to be transferred to the hopper in a controllable manner;

Figure 13 is a sectional view of the control unit of Figure 9 and is taken substantially on the line 13—13 of Figure 9 and illustrates the internal valve structure of the unit;

Figure 14 is a sectional view, like Figure 13, but showing the control unit in a second operating condition;

Figure 15 is a sectional view substantially on the line 15—15 of Figure 14; and

Figure 16:
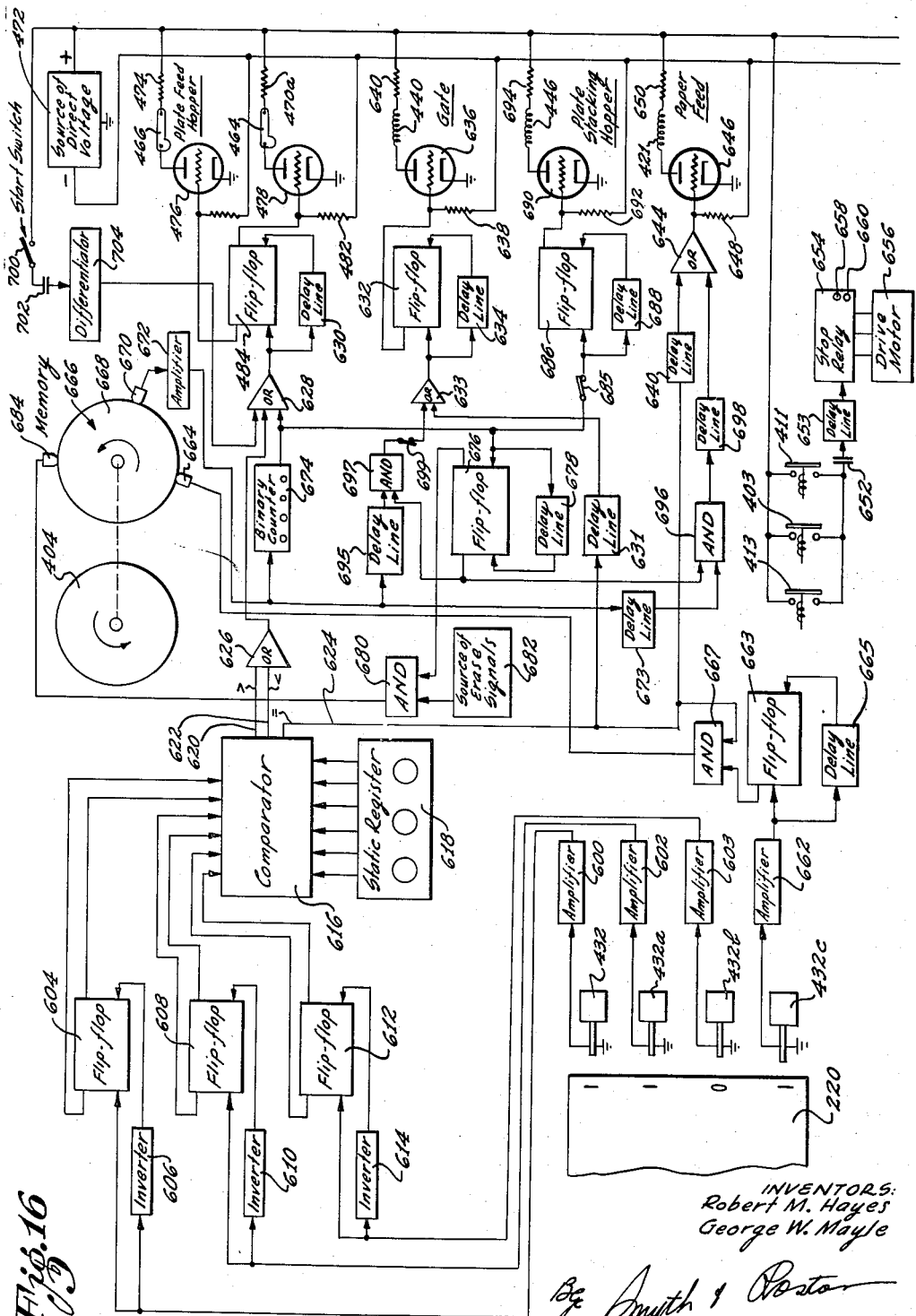
Figure 16 is a circuit diagram partly in block form of an electrical control system of the apparatus of Figures 7 and 8.

The vacuum transport system of Figure 1 illustrates certain principles of the invention on a somewhat schematic basis: The system includes a first vacuum transport drum 10 and a second vacuum transport drum 12. Both these drums are rotatable, and they are preferably mounted on parallel vertical axes adjacent one another and co-acting at a point on their respective peripheries. A vacuum pressure is created, in a manner to be described, at the peripheral edge of each of the drums 10 and 12. This vacuum pressure serves to retain the transported items securely on the respective drums so that such items may be transferred by the drums from one point to another.

An input stack 14 is disposed with its mouth adjacent the periphery of the drum 10. A plurality of information cards are retained in stacked condition within the input stack. The face of the leading card or plate in the stack engages the periphery of the drum 10. By a suitable continuous or controllable transfer mechanism, the cards from the input stack 14 may be continuously or controllably transferred in succession from the stack to the drum 10.

The cards so transferred to the drum 10 are transported by the drum around its periphery and to the co-acting point of the drum 12. Suitable gating means are provided which respond to identifying information on the cards transported by the drum 10 to transfer selected ones to the drum 12. All other cards are carried to an output stack 16 which is also disposed with its mouth adjacent the periphery of the drum 10. The output stack 16 is displaced around the periphery of the drum 10 from the input stack 14 in the direction of rotation of the drum and past the point at which it co-acts with the drum 12. A suitable transfer mechanism is provided for stripping the cards from the peripheral surface of the drum 10 and for depositing such cards in the output stack 16.

The cards transferred to the drum 12 are transported by that drum past an appropriate processing transducer head (not shown). This head may be used to read information from the selected card or cards, or to record new information on such cards. After such processing, the cards transported by the drum 12 may be deposited in a suitable output stack 18. This latter output stack is disposed with its mouth adjacent the rim or periphery of the drum 12. A suitable transfer means is provided for stripping the cards from the drum 12 and for depositing such cards in the output stack 18. Therefore, by the system of Figure 1, information cards can be conveniently selected and processed.

The present invention makes use of vacuum transport systems such as the one shown in Figure 1 in achieving its intended purpose. In accordance with the invention, a drum such as the drum 10 is used to transport discrete master printing plates from a feeding hopper such as the input stack 14, to a stacking hopper, such as the output stack 16.

Each of the master plates transported on the drum 10 may be inked and used to produce a printed duplicate of the information recorded thereon. Alternately, selected ones of the master plates may be transferred to a second drum such as the drum 12, and duplications may be made on only these selected plates.

The details of one possible construction for the vacuum transport drums, such as the drums 10 and 12 of Figure 1, are shown in Figure 2. Since both of these drums may be similarly constructed, a detailed description of one is believed to be sufficient. The illustrated vacuum transport 10 is similar to the drum assembly disclosed and claimed in copending application Serial No. 600,975, filed by Loren R. Wilson on July 30, 1956, now U.S. Patent No. 2,883,189.

This drum has a lower body portion 20 and an upper disc-like portion 22. The body portion 20 of the drum includes a disc-like bottom 24 and an integral annular side 26. The cover 22 has an annular shoulder which is dimensioned to enable the cover to fit snugly on the side 26. The cover is disposed in spaced parallel relation with the bottom 24 to define a hollow enclosure within the unit.

The annular side 26 has two series of axially spaced discontinuous slots 28 and 30 extending around its periphery. These slots communicate with the hollow enclosure to enable a vacuum pressure to be produced at the peripheral edge of the drum when air is exhausted from the enclosure. The lower surface of the cover 22 is bulged, as at 32, to assist in reducing air turbulence within the drum. An annular wedge-shaped element 34 is positioned within the enclosure in press fit with the internal surface of the annular side 26, and this latter element also serves to reduce air turbulence in the drum. The cover 22 is fastened to the body portion 20 by means of appropriate set screws such as the screws 36.

The drum is supported on an annular collar 38 which may be integrally formed on the end of a hollow rotatable shaft 40. The drum 10 is rotatable, for example, about a horizontal axis in an aperture formed in a suitable housing 42. The drive shaft 40 extends through the aperture to drive the drum in an annular direction relative to the housing.

The rotatable shaft 40 is supported in a bearing housing 44 which in turn, is held stationary by means of any suitable supporting bracket or the like (not shown). The shaft 40 is rotatably supported within the housing 44 by means of a pair of axially spaced bearings 46 and 48. These bearings are supported in appropriate bushings 50 and 52 which, in turn, are mounted on the internal surface of the housing 44 by suitable set screws such as the screws 56 and 58.

A drive pulley 60 is rigidly mounted on the shaft 40, and this pulley is axially positioned on the shaft by means of a pair of sleeves 62 and 64. The sleeves are interposed between the pulley and the respective bearings 46 and 48. An opening 66 is formed in the housing 44 to receive a belt 68. The belt extends around the drive pulley 60 and mechanically couples the shaft 40 to a suitable drive motor (not shown). The pulley 60, the sleeves 62 and 64, and the bearings 46 and 48 are held in assembled condition on the shaft 40 by means of a nut 70 and an associated lock washer 72, the nut being screwed on the bottom of the shaft 40. An appropriate sealing disc 74 is also screwed on the bottom of the shaft 40, and this disc is disposed in sealing relation with an end plate 76. The end plate 76 is secured to the housing 44 by suitable screws, such as the screws 78.

The end plate 76 has a central aperture in axial alignment with the interior of the hollow drive shaft 40. A conduit 80 is positioned in the aperture in press fit with the end plate. This conduit communicates with an appropriate vacuum pump which is indicated schematically by the rectangle 82. The vacuum pump draws air in through the annular slots 28 and 30 in the annular side of the drum 10 to provide a vacuum pressure at the periphery of the drum, and such air is drawn through the enclosure formed within the drum and down the interior of the hollow drive shaft 40. At the same time, the drum is rotated by the drive motor coupled to the drive pulley 60 by means of the belt 68. This represents, therefore, one convenient structure for a vacuum transport drum suitable for use in the apparatus of the invention.

The apparatus of Figure 3 uses two vacuum transport drums which are rotatable about spaced and parallel horizontal axes and which may be similar in their construction to the drum discussed in conjunction with Figure 2. As noted previously, the particular embodiment of the invention represented in Figure 3 utilizes offset lithograph printing principles. In a manner to be described, this apparatus is capable of producing in one operational cycle a printed duplicate from each of a series of discrete master plates, or of producing a printed duplicate from selected ones of the master plates. This embodiment, therefore, may be considered a continuous-feed, single-impression, successive offset lithograph printing mechanism.

In the illustrated apparatus, discrete master plates are successively fed on to a vacuum transport drum from a feeding hopper, and these plates are carried by the drum into successive engagement with what may be termed a blanket cylinder. An impression of each master plate is made on the blanket cylinder, and the plates continue around the transport drum to a stacking hopper. Meanwhile, sheets of impression paper are fed from a paper-feeding hopper onto another vacuum transport drum. The sheets of paper are carried into contact with the respective impressions on the blanket cylinder. The sheets are then transported by the latter drum to an appropriate paper-receiving hopper.

The above operation provides a single impression duplicate for each plate for each operational cycle of the mechanism. Means is provided for automatically recycling master plates through a second cycle to enable a second series of duplicates to be made, and this may be repeated for as many duplicates as are desired. Also, and in a manner to be described, the apparatus may be controlled so that printed duplicates are made of selected ones only of the discrete master plates.

The apparatus of Figure 3 includes a housing 100. A pair of vacuum transport drums 102 and 104 are rotatably mounted in the housing on respective spaced, parallel horizontal axes. The drums 102 and 104 may be constructed in a manner similar to the drum described in Figure 2.

The drums 102 and 104 are disposed in a selected vertical plane and are spaced apart a predetermined distance. A third rotatable drum 106 is mounted for rotation in the same vertical plane as the drums 102 and 104, and about a horizontal axis parallel to the axes of rotation of the drums 102 and 104. The drum 106 is pivotally mounted in a manner to be described, and appropriate biasing means is provided for resiliently urging this drum against the drums 102 and 104 in the illustrated manner. The drums 102 and 104 may both be rotatable in a counterclockwise direction, and the drum 106 may be rotatable in a clockwise direction to enable simultaneous coacting rotation of the drum 106 with each of the drums 102 and 104.

The drum 106 is constructed to constitute what may be termed a blanket cylinder of the usual rotatable type. Such blanket cylinders, in themselves, are well known in the offset lithograph art. The vacuum transport drums 102 and 104 may, for example, have a diameter of the order of eight inches, and the blanket cylinder 106 may have an appropriate diameter dictated by such diameters of the vacuum transport drums. The surface of the blanket cylinder may have any suitable rubber-like composition as is known to the offset printer art, and this surface should be easily and inexpensively replaceable.

The vacuum transport drum 102 is intended to transport discrete master plates on its peripheral surface in the manner described. For this purpose, a feeding hopper 108 is diagonally supported by the housing 100, and the mouth of this hopper is positioned adjacent the peripheral edge of the drum 102. The hopper 108 may hold, for example, 500 to 3000 master printing plates, and these plates may, for example, have a width of three inches and a length of five inches.

Each of the master plates has information or data recorded on it which is to be duplicated by the apparatus of the invention. The information is recorded on each of the plates as a positive offset image. As the master plates are moved against the blanket cylinder 106 by the drum 102, a mirrored ink image is formed on the cylinder. Subsequently, when impression paper is pressed against the cylinder 106 by the drum 104, the image is transferred to the paper.

The plates from the feeding hopper 108 are fed continuously and successively to the periphery of the vacuum transport drum 102 in a manner to be described, and the plates are transported by this drum in a spaced sequence around the peripheral rim of the drum. The drum may be equipped with angularly spaced recessed arcuate slots around its periphery for positioning the master plates so as to achieve a positive registration between each of the master plates and the drum.

When a master plate is fed to the vacuum transport drum 102 from the feeding hopper 108, it is first transported past a roller 110. This roller is rotatably mounted in the housing 100 and bears against the periphery of the drum 102 so as to rotate as the drum rotates. The roller 110 engages a second roller 112, and the second roller is submerged in a pan 114 of a suitable moistening substance. A reservoir 116 maintains the pan 114 full of the moistener so that there may be a continuous flow of fluid to the offset face of each of the master plates. The master plates are, therefore, each first moistened by their engagement with the roller 110 and this conditions their printing surfaces for inking. Water can be used for this purpose.

A pair of spaced inking rollers 118 and 120 are rotatably mounted in the housing 100. These inking rollers also bear against and engage the peripheral rim of the drum 102, and they are displaced slightly from the roller 112 around the transport drum 102 in the direction of rotation of the drum. Each of the rollers 118 and 120 engages a larger idler roller 122, and the roller 122 effectively communicates with a supply of ink in a pan 124 through a series of idler rollers 126, each such roller being rotatably mounted in the housing 100. A reservoir 128 maintains the pan 124 full of a suitable printing ink.

Therefore, as the transport drum 102 rotates, the offset surface of each of the master plates carried on its periphery is first moistened, and then a film of ink is placed over its high-relief portions. The inked master plates are then rotated against the blanket cylinder 106, and each such plate forms an inked mirrored image on the peripheral surface of that cylinder.

A cleaning roller 130 is rotatably mounted in the housing 100, and this roller bears against the drum 102. The roller 130 is located at an angular position on the rim of the drum 102 past the point of contact of the drum and the blanket cylinder 106 with respect to the direction of rotation of the drum. This cleaning roller 130 removes the excess ink from the master plates. The roller 130 communicates with a suitable solvent in a pan 132 through a series of idler rollers 134. The rollers 134 are rotatably mounted in the housing 100, and they are driven by the rotation of the roller 130 by the drum 102. A supply of solvent in the pan 132 is maintained by a reservoir 136.

The master plates next pass a roller 138 which is rotatably mounted in the housing 100 and which also bears against the drum 102. The roller 138 is mounted at a point displaced from the roller 130 in the direction of rotation of the drum 102. The roller 138 applies a suitable preservative to the master plates. This roller communicates through a series of rollers 142 with a pan 140 containing the preservative. These rollers are also rotatably mounted in the housing 100. An adequate supply of the preservative is maintained in the pan 140 from a reservoir 144.

After the preservative has been applied, the master plates are dried by a blower 146. The blower is mounted on the housing 100 and directs a pressurized air stream against the plates after they have passed the roller 138. This air stream is obtained from a suitable pressure pump (not shown) over a line 148.

The master plates then pass to a stacking hopper 150. The bottom portion of this hopper is shown broken away for clarity of illustration. However, it is to be understood that the stacking hopper 150 is angularly mounted in the housing 100, and it extends to the rim of the transport drum 102. The mouth of this hopper is disposed adjacent the transport drum. Suitable transfer means, as will be described, are provided for stripping the master plates from the drum 102 and for depositing them in the stacking hopper 150.

Therefore, each master plate is fed from the feeding hopper 108 to the transport drum 102. The offset surface of each such plate is then moistened by the roller 110, and it is then inked by the rollers 118 and 120. An impression of each of the inked plates is made on the rim of the blanket cylinder 106, and the plates then circulate past the cleaning roller 130, which removes excess ink; past the roller 138, which applies the preservative; and past the blower-dryer 146 to the stacking hopper 150.

A further roller 152 is also rotatably mounted in the housing 100, and this latter roller is positioned to bear against the blanket cylinder 106. The roller 152 removes any residual ink from the rim of the blanket cylinder before inked master plates are brought into contact with the cylinder to form mirrored inked images thereon.

The inked images on the rim of the blanket cylinder are brought into contact with successive sheets of impression paper which are transported by the vacuum transport drum 104. This impression paper is fed to the drum from a paper-feeding hopper 160. The feeding hopper 160 may be mounted on the housing 100, and it is constructed to hold the sheets of impression paper in a vertical stack. An appropriate spring biasing means may be provided within the hopper to urge the papers upwardly to the top of the hopper and against the lower face of a feeding arm 162.

The feeding arm 162 is pivotally mounted on a pivot shaft 164. A spring 166 extends to the housing 100 from the end of the feeding arm remote from its lower face. This spring normally biases the lower face of the feeding arm 162 down over the upper surface of the top sheet of paper in the hopper 160. A solenoid 168 is mounted on the housing 100 by any suitable means (not shown). This solenoid has an armature 170 which is coupled to the upper end of the feeding arm 162. When the solenoid is energized, it draws its armature 170 to the right in Figure 3, and this pivots the feeding arm 162 about the shaft 164 and in opposition to the bias action of the spring 166. An air line 172 is coupled to the feeding arm 162, and this line extends to a suitable vacuum pump (not shown). One or more channels extend through the feeding arm 162 from the line 172 to corresponding orifices in the lower face of the arm. It will be remembered that this face of the feeding arm engages the upper surface of the top sheet of paper in the hopper 160.

A vacuum pressure is created, therefore, at the lower face of the arm 162. This pressure holds the top sheet of paper against the lower face of the arm. Then, when the solenoid 168 is energized, the arm pivots about the shaft 164 and moves the top sheet of paper up against the periphery of the vacuum transport drum 104. The vacuum pressure at the periphery of the drum 104 is sufficient to overcome the vacuum pressure at the lower face of the arm 162 so that the top sheet of paper from the hopper 160 is transferred from the arm to the drum.

The solenoid 168 is energized in synchronism with the feed of the master plates to the transport drum 102. The arm 162 is pivoted to feed a sheet of impression paper to the periphery of the drum 104 at the proper time so that the sheet is moved with correct registration against a corresponding mirrored image on the blanket cylinder 106. The correct registration is such that the mirrored image from the blanket cylinder is transferred to the sheet of paper.

A paper-receiving hopper 174 is mounted in the housing 100. The hopper 174 is also mounted to house the sheets of paper in a vertical stack. The mouth of the hopper is positioned adjacent the rim of the transport drum 104. A knife edge member 176 is positioned adjacent the trailing edge of the hopper 174, and this member engages the rim of the drum 104. This knife edge strips the sheets of impression paper from the periphery of the drum 104 as they are circulated to the receiving hopper 174, and it serves to deposit the paper sheets in the receiving hopper.

Therefore, as the master plates are circulated around the vacuum transport drum 102, corresponding sheets of impression paper are synchronously circulated around the drum 104. The sheets are transported into respective contact with the inked images on the blanket cylinder 106, and each receives an imprint of the information on a corresponding master plate. The imprinted sheets are then successively deposited in the receiving hopper 174.

As previously mentioned, each master printing plate may be circulated by the transport drum 102 and caused to impress an inked mirror image on the rim of the blanket cylinder 106 so that a corresponding printed duplicate may be obtained. However, the need often arises for a printed duplicate only of a certain selected one or group of the master plates. Such selective printing may be carried out by pivoting the blanket cylinder 106 in the manner shown in Figure 4.

As shown in Figure 4, the blanket cylinder 106 is pivotally mounted on a shaft 179 at one end of a lever arm 182. The lever arm is rotatably mounted at its center on a shaft 180. A spring 186 is fastened between the other end of the lever and the housing 100. The spring rotatably biases the lever in a counter-clockwise direction about the shaft 180 to bring the cylinder 106 into firm engagement with the transport drums 102 and 104. A solenoid 188 is mounted in the housing 100 by any suitable means (not shown), and the armature 190 of this solenoid is also affixed to the end of the lever 182 remote from the cylinder 106. When the solenoid 188 is energized, the lever 182 is rotated about the shaft 180 in opposition to the biasing action of the spring 186 and in a clockwise direction to move the blanket cylinder 106 away from the transport drum 102.

A series of transducer heads such as the head 192 are positioned adjacent the transport drum 102. These heads scan the master plates as these plates are carried in succession past the heads by the drum. The heads serve to read certain identifying information which, for example, is magnetically recorded on each of the master plates. The heads develop output signals in response to such information, and these output signals are fed into a control system (to be described) to energize the solenoid 188 in a selective manner. The solenoid is so energized and holds the blanket cylinder 106 out of contact with the vacuum transport drum 102 for all the master plates except those for which a duplicate is to be made. The solenoid 188 becomes deenergized and the blanket cylinder 106 is forced against the drum 102 for each of the latter plates to receive respective inked impressions from the same.

The feeding and stacking hoppers 108 and 150 may be constructed in the manner shown in Figure 5. The feeding hopper 108 is shown, for example, in that Figure; and the stacking hopper 150 may have the same construction. A stop member 193 is positioned adjacent the trailing edge of the hopper 108 with respect to the direction of rotation of the drum 102. This stop member is affixed to, and may be integral with, a bracket 194. The bracket is mounted on an appropriate supporting surface of the housing 100 by means, for example, of a pair of screws 196. The screws extend through corresponding slots in the bracket 194 to enable the bracket to be slidable on its supporting surface and in a radial direction with respect to the drum 102.

The bracket 194 is normally biased by means, for example, of a spring (not shown) toward the drum so that the stop 193 normally engages the rim of the drum. When the stop is in such a position, no cards can leave the feeding hopper 108, and any card circulated on the drum 102 against the stop is deposited in the hopper.

A guide pawl 198 is positioned adjacent the drum 102, and this pawl is angularly displaced from the trailing edge of the hopper 108 against the direction of rotation of the drum 102 by a distance less than the length of the individual master plates. The pawl has a bulged center section that protrudes outwardly from the rim of the drum. When a plate is stopped by the stop 193, its trailing end projects over the top of the pawl 198. Then the next plate rides up over the pawl under the preceding plate and causes such preceding plate to be deposited in the stacking hopper.

A solenoid 200 is mounted on the housing 100 by any suitable means (not shown), and this solenoid has an armature 202 secured to the bracket 194 of the stop 193. When the solenoid 200 is energized, it draws the bracket 194 and the stop 193 back from the rim of the drum 102. This withdrawal of the stop 193 is just sufficient to enable a single master plate to pass between the stop and the rim of the drum 102. When the solenoid is so energized, the plates are able to leave the hopper 108 one at a time to be successively fed to the periphery of the transport drum 102.

The stacking hopper 150 has a similar stop 204 disposed against its trailing edge, and this latter stop is controlled by a solenoid 206. This hopper also has a pawl 207 positioned in front of its mouth. This pawl is the equivalent of the pawl 198 at the hopper 108 and it serves the same purpose.

Whenever the solenoid 200 is energized and the solenoid 206 is not energized, the apparatus proceeds in the manner described. That is, the hopper 108 feeds the master plates successively to the periphery of the transport drum 102. Then, and after the plates have been suitably processed in the manner described, they are stripped from the drum 102 by the stop 204 and pawl 207 and deposited in the stacking hopper 150.

When the stacking hopper 150 is full and the operational cycle is complete, it is often desirable to recirculate the master plates to the feeding hopper 108. This recirculation of the master plates conditions the apparatus for the next operational cycle. To accomplish this recirculation, the solenoid 206 is energized and the solenoid 200 is deenergized. This causes the stop 193 to engage the periphery of the drum 102 and the stop 204 to be withdrawn. The hopper 150 now feeds the plates successively to the transport drum 102, and the plates are transported back to the hopper 108. Now, as each plate is transported against the stop 193, it is arrested with its trailing edge projecting over the pawl 198. The next plate then is moved up over the pawl and under the proceeding plate so that the plates are successively deposited in the hopper 108 and in their original sequence. In this manner, each of the plates from the hopper 150 is returned to the hopper 108, and the plates are restacked in the hopper 108 in their original order. When it is desired to initiate a second cycle of operations, the solenoid 206 is deenergized and the solenoid 200 is again energized. This again forms the hopper 108 into a feeding hopper and the hopper 150 into a stacking hopper.

In the electric control system of Figure 6, one of the master plates is represented at 220. This plate has a row of identifying information disposed, for example, along its leading edge. Such information in the illustrated embodiment is in the form of magnetic dots of a first or a second polarity. However, the information could similarly be recorded by means of the presence or absence of holes, or in any other manner. This information, for example, is in the form of a multi-digital binary number. In the illustrated example, and purely for reasons of simplicity, the binary number has three digits only. However, in order that a relatively large number of master plates can be handled by the system, it is contemplated that binary numbers of the order of seven digits be used for identifying the plates.

The identifying information of each master plate is scanned by the transducer head 192 and by a series of associated heads 192a, 192b and 192c. In the illustrated embodiment, four heads are used, one for each digit of the binary number and one to read a synchronizing mark on the plates. It is apparent that more heads will be required as more complex binary numbers are used.

Each of the heads 192, 192a and 192b has one terminal connected to a point of reference potential or ground, and these heads have a second terminal respectively connected to the fixed contacts of a series of single-pole single-throw switches 224, 226 and 228. The movable arms of these switches are respectively connected to a series of amplifiers 232, 234 and 236. The transducer head 192c has one terminal connected to ground, and its other terminal is connected directly to an amplifier 233.

The amplifier 232 is connected to the left input terminal of a flip-flop 240, and this amplifier is also connected to an inverter 242. The output terminal of the inverter 242 is connected to the right input terminal of the flip-flop 240.

The amplifier 234 is connected to the left input terminal of a flip-flop 244, and this amplifier is also connected to an inverter 246. The output terminal of the inverter 246 is connected to the right input terminal of the flip-flop 244. The amplifier 236 is connected to the left input terminal of a flip-flop 248 and to the input terminal of an inverter 250, the output terminal of the inverter 250 being connected to the right input terminal of the flip-flop 248.

The left and right output terminals of each of the flip-flops 240, 244 and 248 are all individually connected to a comparator 252. The comparator is shown in block form for purposes of simplicity. Actually, this comparator is formed from a plurality of "AND" and "OR" networks interrelated in a logical pattern. The comparator can be constructed and operated in a manner similar to that disclosed on Patents 2,155,825 to Haselton; 2,364,540 to Luhn; 2,484,081 to Dickinson; 2,501,821 to Kouzmine; 2,580,768 to Hamilton; 2,615,127 to Edwards; 2,641,696 to Woolard; 2,674,727 to Spielberg and 2,679,638 to Bensky.

A static register 254 is included in the system, and it has a plurality of output terminals which are also connected to the comparator 252. The static register also is shown in block form for purposes of simplicity. This unit, in itself, is well known and may be a dial set or a wire plug board. The purpose of the static register is to set up static voltage conditions at its output terminals corresponding to a selected binary number established by manual adjustment of the register. This number sets up a base in the comparator 252 to provide a desired control effect when the identifying information of one of the master plates 220 matches this number.

The static register may, for example, take the form of a plurality of flip-flops permanently established in one operating condition, and whose output terminals may be manually and selectively switched to the output terminals of the register. Each such flip-flop would correspond to a digit of the binary number to be set up in the comparator 252, and each such digit could be made "0" or "1" by the selective manual switching of the output terminals of its associated flip-flop. A somewhat similar arrangement is shown, for example, in Fig. 9 of co-pending application Serial No. 566,404, which was filed February 20, 1956, in the name of Jerome B. Wiener and which is assigned to the assignee of the present application.

The comparator 252 has three output terminals, and the leads 256, 258 and 260 are respectively connected to these terminals. A pulse appears on the lead 256 when the binary equivalent of the information set up in the flip-flops 240, 244 and 248 is less than the binary number manually set up in the static register 254. A pulse appears on the lead 258 when the binary information from the flip-flops represents a number that is greater than that in the static register, and a pulse appears on the lead 260 when the binary number set up in the flip-flops matches and is equal to the binary number manually set up in the static register.

The leads 256 and 258 are connected respectively to the movable arms of a pair of single-pole-double-throw switches 257 and 259. Each of these switches has an upper fixed contact connected to an "OR" network 262. This "OR" network, in turn, is connected to the left input terminal of a flip-flop 264 and to the input terminal of a delay line 266. The output terminal of the delay line 266 is connected to the right input terminal of the flip-flop 264.

The left output terminal of the flip-flop 264 is connected to the control grid of a vacuum tube 268. The cathode of this tube is connected to ground, and the anode of the tube is connected to one terminal of the energizing winding of the solenoid 188. This solenoid, it will be remembered, actuates the blanket cylinder 106 and moves it away from the transport drums 102 and 104 when the solenoid is energized. The other terminal of the winding of the solenoid 188 is connected to a resistor 270 which, in turn, is connected to the positive terminal of a source of direct voltage 272. The control grid of the tube 268 is connected to one terminal of a resistor 274. The other terminal of this resistor is connected to the negative terminal of the source 272 of direct voltage. This source has a neutral terminal connected to ground.

The lead 260 and the lower fixed contact of each of the switches 258 and 259 are connected to an "OR" network 276, and the output terminal of this "OR" network is connected to a delay line 278. The time delay of this line is preferably adjustable, and the line is connected to the control grid of a vacuum tube 280. The cathode of the tube 280 is connected to ground, and the anode of the tube is connected to one terminal of the energizing winding of the solenoid 168. The other terminal of the energizing winding is also connected to the resistor 270. This solenoid, as previously described, controls the feed of the sheets of paper from the hopper 160 to the transport drum 104. The control grid of the tube 280 is connected to a resistor 282, which, in turn, is connected to the negative terminal of the source 272.

The amplifier 238 is connected to a binary counter 284. This binary counter may be constructed in any known manner, and such counters in themselves are well known to the art. The counter functions to develop a pulse at its output terminal in response to a predetermined number of pulses introduced to its input terminal. The output terminal of the binary counter is connected to a delay line 286. This delay line is connected to the movable arm of a single-pole-double-throw switch 288. One of the fixed contacts of the switch 288 is connected to the right input terminal of a flip-flop 290.

The left output terminal of the flip-flop 290 is connected to the control grid of a vacuum tube 292. The cathode of the tube 292 is connected to ground, and the anode of this tube is connected to one terminal of the energizing winding of the solenoid 200 associated with the master plate feeding hopper 108. The other terminal of this energizing winding is also connected to the resistor 270, for connection by that resistor to the positive terminal of the source 272. The control grid of the tube 292 is connected to a resistor 294, the resistor being connected to the negative terminal of the source 272.

The right output terminal of the flip-flop 290 is connected to the control grid of a vacuum tube 296. This control grid is connected to one terminal of a resistor 298, the other terminal of this resistor being connected to the negative terminal of the source 272.

The cathode of the tube 296 is connected to ground, and the anode of this tube is connected to the energizing winding of the solenoid 206 associated with the master plate stacking hopper 150. The other terminal of the winding 206 is connected to the resistor 270 for connection to the positive terminal of the source 272.

The drive motor for the drums 102 and 104 is represented by the rectangle 300. This drive motor is controlled by a stop relay 302. A pair of push buttons 304 and 306 is associated with the stop relay to manually control the starting and stopping of the drive motor. An "OR" network 308 is connected to the stop relay 302, and a signal passed by the "OR" network causes the stop relay to stop the drive motor 300.

A switch 310 is positioned in the plate feeding hopper 108. This switch may be a spring-biased push button type and also may be a "micro switch," such as is manufactured by the Minneapolis-Honeywell Corporation of Minneapolis, Minnesota. This switch is positioned to one side of the plate feeding hopper and near the top of the hopper. It is actuated and closed only when the feeding hopper is full of master plates, the edge of the uppermost plate in this condition contacting and actuating the switch 310.

One terminal of the switch 310 is connected to the resistor 270, and a capacitor 312 connects the other terminal of the switch to a differentiator 314. The output terminal of the differentiator is connected to the left input terminal of the flip-flop 290. The output terminal of the differentiator is also connected to the "OR" network 308, as is the other fixed contact of the switch 288.

A manually operated, single-pole-single-throw switch 316 is provided. This switch is mechanically coupled to the switches 224, 226 and 228 for uni-control operation. The arrangement is such that when the switch 316 is closed, the switches 224, 226 and 228 are all opened. Contrariwise, when the switches 224, 226 and 228 are closed, the switch 316 is opened.

It might be pointed out that the electronic units referred to as "flip-flops" are well known to the computer and data processing art. These networks are bistable trigger circuits; that is, each such circuit responds to the trailing edge of a positive pulse impressed on its left input terminal to be triggered to what is termed a "true" state. When the network is in its "true" state, it exhibits a relatively high voltage at its left output terminal and a relatively low voltage at its right output terminal. The network remains in its "true" state until a pulse is impressed on its right input terminal. The network then responds to the trailing edge of a positive pulse introduced to its right input terminal to be triggered to what is termed its "false" state. When the network is in its "false" state, it exhibits a relatively low voltage at its left output terminal and a relatively high voltage at its right output terminal. The network remains in its "false" state until it is again triggered to its "true" state.

The inverter units represented in the control system of Figure 6 may be of any well known type. For example, a usual vacuum tube amplifier will serve for this purpose.

The "OR" networks referred to are also well known to the computer and data processing art. Such networks function to translate any one of a plurality of signals that might be introduced to its input terminals, and such signal is passed to the output terminal of the network. The "AND" networks are also well known. These latter networks function to pass a signal to the output terminals only in the presence of all of a plurality of signals that are to be impressed on its input terminals.

The networks described above, as noted, are exceedingly well known. For this reason and for purposes of clarity and simplicity, these networks and other known electronic units are represented in block form in the control system shown in Figure 6. It might be pointed out that the "AND" networks may be constructed in a manner similar to that shown in Figure 3 of Patent 2,723,080 and Figure 12 of Patent 2,609,143. It might also be pointed out that the transducers 192, 192a, 192b and 192c may have any known construction or they may take the form of the heads described in co-pending application Serial Number 550,296 filed December 1, 1955 by Alfred M. Nelson and Jerome B. Wiener. The differentiator 314 may be constructed in a manner similar to that disclosed on pages 2–27 and 2–38, inclusive, of "Principles of Radar," second edition, by the Massachusetts Institute of Technology.

As previously noted, it is assumed that each master plate has at least one column of identifying information. That identifying information is illustrated as composed of three integers, the bottom row being used to indicate the start of a plate and it is contemplated that each plate will have an indication of, for example, "1" in that position. Each card will have different identifying information formed in its first column, and the static register 254 may be manually adjusted to set up matching information for any one or more plates, so that such plates may be selected in a manner to be described.

When it is desired to make a single duplicate of each plate, and with no selection, the switch 316 is closed and this causes the switches 224, 226 and 228 to be opened. Alternately, the switch 316 may be opened and the switches 224, 226 and 228 closed, and the movable arms of the switches 257 and 259 moved to their lower contacts.

The push-button 304 of the stop relay 302 may now be depressed to energize the drive motor 300 and cause the transport drums 102 and 104 to rotate, and also to cause these drums to drive the blanket cylinder 106 through any suitable and usual coupling arrangement (not shown).

The flip-flop 290 is in its "true" state so that it exhibits a relatively high voltage at its left output terminal and a relatively low voltage at its right output terminal. The relatively high voltage at the left output terminal of the flip-flop 290 causes the vacuum tube 292 to be conductive and an energizing current flows through the energizing winding of the solenoid 200. This causes the solenoid to move the stop 193 away from the periphery of the transport drum 102 so that master plates are continuously and successively fed one-after-another to the periphery of the drum 102 from the plate feeding hopper 108.

At the same time, the relatively low voltage at the right output terminal of the flip-flop 290 causes the vacuum tube 296 to be nonconductive so that no energizing current flows through the winding of the solenoid 206. Therefore, the stop 204 associated with the plate stacking hopper 150 is spring biased against the periphery of the drum 102 so that it is in a position to remove the master plates from the periphery of the drum 102 and to cause such plates to be stacked in the hopper 150.

As the plates leave the feeding hopper 108, they pass in succession past the transducer heads 192, 192a, 192b and 192c. In this condition, the transducer head 192, 192a and 192b are ineffective because the switches 224, 226 and 228 are open. However, the transducer head 192c introduces a pulse to the amplifier 238 each time a card passes that head. This is due to the fact that the transducer reads the "1" which is recorded at the lower row of each such plate. The amplifier 238, accordingly, introduces a pulse to the binary counter 284 for each such plate.

The amplifier 238 also introduces a pulse through the "OR" network 276 and through the delay line 278 to the control grid of the tube 280 for each plate. The delay line 278 delays the pulse by a predetermined amount so that it is impressed on the control grid of the tube 280 to produce an energizing current through the winding of the solenoid 168 at a selected time after the particular master plate has passed the head 192c. This flow of energizing current through the winding of the solenoid 168 causes the feed arm 162 (Figure 4) to pivot and feed a sheet of impression paper to the periphery of the transport drum 102. The time selected is such that the paper is fed at the time necessary so that it will be circulated by the drum 102 and engage and precisely register with inked impression on the blanket cylinder 106 made by the corresponding master plate. As previously noted, the delay line 278 is preferably made manually controllable so that the operator can control the registration of the masters and the impression paper. In this manner, each master plate, as it passes the head 192, causes a sheet of impression paper to be fed to the drum 104, and each such sheet is accurately positioned to register exactly with the inked impression of its corresponding master plate.

After all or a predetermined number of the master plates have been so processed, and after a printed duplicate has been formed of each such plate, the binary counter 284 develops an output pulse. If it is desired to stop the system at this point, the movable arm of the switch 288 is set to engage its lower fixed contact. Then, the pulse from the binary counter, after a delay by the delay line 286 is introduced through the "OR" network 308 to the stop relay 302. However, if it is desired to recycle the master plates to the feeding hopper 108, the switch 288 is set to its illustrated position with its movable arm in contact with its upper contact. Now, when the binary counter 284 develops a pulse representing that the master plates have all been processed, the delay line 286 delays that pulse a sufficient time to enable the last plate to be circulated to the stacking hopper 150. Then, the pulse is introduced to the right input terminal of the flip-flop 290. This causes the flip-flop to be triggered to its "false" state and the tube 296 now becomes conductive and the tube 292 becomes nonconductive. The conductivity of the tube 296 causes the energizing winding of the solenoid 206 to be energized thereby to raise the stop 204 from the periphery of the transport drum 102. Likewise, now that the winding of the solenoid 200 is de-energized by the nonconductivity of the tube 292, the stop 193 is spring biased down against the periphery of the transport drum 102.

When the system is in this latter condition, the plates are continuously and successively fed one after the other from the stacking hopper 150 back to the feeding hopper 108. When the operation is complete and the feeding hopper becomes full, the switch 310 is actuated. This actuation of the switch 310 connects the capacitor 312 to the positive terminal of the source 272 by way of the resistor 270. The resulting transient pulse appearing across the capacitor 312 is sharpened in the differentiator 314, and this pulse is impressed on the left input terminal of the flip-flop 290. The pulse triggers the flip-flop to return the tubes 292 and 296 to their previous respective conductive and nonconductive states. The solenoid 200 is now energized so that the hopper 108 may function as a feeding hopper, and the solenoid 206 is de-energized so that the hopper 150 may now function as a stacking hopper. At the same time, the pulse from the differentiator 314 is impressed on the stop relay 302 through the "OR" network 308 to stop the drive motor 300. Then, if a second duplicate is desired for the plates, it is merely necessary to depress the start button 304 on the stop relay 302 to re-initiate the cycle.

When it is desired to obtain a duplicate of selected ones only of the master plates, the switch 316 is opened, which causes the switches 224, 226 and 228 to close against their upper contacts. The switches 257 and 259 may, for example, be adjusted so that their movable arms respectively engage their upper fixed contacts. The static register 254 is now manually adjusted to produce pulses representing a binary number corresponding to the identifying number of the plates to be printed, and this binary number is set up in the comparator 252.

Now, as the master plates are fed to the transport drum 102 by the feeding hopper 108 and as these plates circulate in succession past the transducer heads 192, 192a, 192b and 192c, their identifying information, as amplified by the amplifiers 232, 234 and 236, triggers the flip-flops 240, 244 and 248 into operational states corresponding to that identifying information. It will be noted that the pulses from the amplifiers 232, 234 and 236 are impressed on the left input terminals of the flip-flops 240, 244 and 248 and also through the inverters 242, 246 and 250 on the right input terminals of these flip-flops. This assures that the flip-flops will be triggered in accordance with the identifying information of each successive plate, and that the triggered state of the flip-flops produced by any plate will be altered by the next succeeding plate.

The information set up in the flip-flops 240, 244 and 248 is introduced to the comparator 252. As long as that information does not match the information set up in the comparator by the static register 254, a pulse will appear on either the lead 256 or 258. Such a pulse is introduced to the left input terminal of the flip-flop 264 to trigger that flip-flop to its "true" state. The tube 268 is thereby rendered conductive and an energizing current flow is produced through the winding of the solenoid 188. This causes the blanket cylinder 106 to be pivoted away from the transport drum 102 so that the corresponding master plate is circulated past the blanket cylinder without making an inked impression on that cylinder. Also, and because no pulse was impressed on the tube 280, the paper feed solenoid 168 is not energized and no paper is fed to the vacuum transport drum 104.

Therefore, as each plate is processed by the transducer heads 192, 192a and 192b and so long as the identifying information on such plates does not match that set up in the static register, the blanket cylinder is pivoted out of contact with the transport drum 108 and the paper-feeding mechanism is not actuated. Therefore, such plates are merely circulated to the stacking hopper 150 and no printed duplicate is made.

However, when a plate having identifying information which equals the binary number set up in the static register is scanned by the transducer heads, a pulse appears on the output lead 260 from the comparator. This pulse is fed through the delay line 278 to cause the paper feed solenoid 168 (Figure 3) to be energized so that a sheet of sensitized paper is fed to the transport drum 104 at the proper time to receive the inked impression from the blanket cylinder 106. Such an inked impression is made by the particular master plate because of the fact that, for that particular plate, the solenoid 188 is not energized and the blanket cylinder is not pivoted away from the transport drum 102.

Therefore, only those plates having identifying information matching the binary number established by the static register are processed by the system and printed duplicates are made only from those plates.

The remaining operations are similar to those described above, with the last master plate causing the binary counter 284 to produce an output pulse which, in turn, either produces recirculation of the master plates or, when the switch 288 is moved to its lower contact, stops the system.

It is sometimes desirable for the apparatus to print when the data set up in the static register 254 is equal or less than the identifying information on the masters. This would be the case, for example, when the identifying information pertained to subscription expiration dates, and only unexpired prints were desired. This latter mode of operation can be obtained merely by closing the movable arm of the switch 257 on its lower contact. Then, in the manner described, printing operations are initiated when output pulses appear on either the leads 256 or 260. Likewise, by closing the movable arm of the switch 259 on its lower contact, printing may also be obtained whenever the identifying information on a master exceeds that set up in the static register.

The apparatus shown in Figure 7 is an intermittent-feed multiple-impression selective offset lithographic printer. The apparatus is capable of producing a continuous flow of single prints from a series of continuously fed master plates; of producing a flow of multiple prints from a series of master plates without selection and with each master plate being duplicated as many times as desired; of producing a flow of single or multiple prints from selected ones only of the master plates, with all the plates being recycled in order in a single stacking hopper; and of producing a flow of single or multiple prints from selected ones only of the master plates, with the selected plates being stacked in an independent stacking hopper.

The apparatus of Figure 7 includes a housing 400 for the equipment. A feeding hopper 402 for the master plates is supported in the housing 400. An appropriate transfer mechanism, which will be described in detail, is associated with the hopper 402. This transfer mechanism serves to controllably feed the master plates from the hopper onto the periphery of a vacuum transport drum 404. A switch 403 (Figure 8) is mounted on one wall of the hopper 402 and near its mouth. This switch may also be of the "microswitch" type. The switch is normally held open by the plates in the hopper. However, when the last plate leaves the hopper, the switch is spring biased to a closed condition.

The transport drum 404 may be similar in its construction to the drum 10 of Figure 2. The drum 404 is rotatably mounted in the housing 400 about a horizontal axis. A second vacuum transport drum 406 for the plates is rotatably mounted in the housing 400. The drum 406 is, likewise, rotatable about a horizontal axis and is positioned generally adjacent and above the drum 404.

A controllable gating mechanism, which will be described, feeds all or selected ones of the master plates from the drum 404 to the drum 406. The drum 406 may be similar in its construction to the drum 102 of Figure 3, and it has a series of rollers associated with its periphery and which serve to apply ink to the surface of the master plates and to perform the various other functions described previously. It is believed unnecessary to repeat in detail the specific functions of each one of these rollers.

A blanket cylinder 408 is rotatably mounted in the housing 400 on a horizontal axis, and this cylinder is positioned adjacent the drum 406. The cylinder 408 is generally displaced in a horizontal direction from the drum 406. The blanket cylinder 408 may have the same composition as the cylinder 106 of Figure 3. However, the blanket cylinder 408, unlike the former, is not pivotable and whenever a master plate is transferred from the vacuum transport drum 404 to the vacuum transport drum 406, such plate is inked and moved against the periphery of the blanket cylinder 408 to make an impression on that cylinder.

The apparatus includes a plate stacking hopper 410 which is mounted in the housing 400. This stacking hopper has a suitable transfer mechanism for stripping the master plates from the vacuum transport drum 404 and for depositing such plates in the hopper. A switch 411 (Figure 8) is mounted on one wall of the hopper 410 near the top of the hopper. This switch may also be of the "Micro Switch" type, and it is normally spring biased to an open condition. However, when the stack of plates in the hopper reaches a predetermined level, the top plate engages and closes the switch.

The equipment also includes a second stacking hopper 412 for the master plates, and this stacking hopper is associated with the rotatable transport 406. A suitable control member 414 (Figure 12) is pivotally mounted in the housing 400 on a pivot pin 415, and this control member may be actuated to a position in which it strips the master plates from the drum 406 and deposits them in the hopper 412. The member 414 is controllable in a manner to be described in conjunction with Figure 12.

A switch 413 is mounted on the wall of the hopper 412 near the top of the hopper. This switch may also be of the "Micro Switch" type and it is normally spring biased to an open condition. However, when the stack of master planes in the hopper reaches a predetermined level, the top plate engages and closes the switch.

The equipment also includes a paper transport and impression cylinder 416. This cylinder is rotatably mounted in the housing 400 about a horizontal axis, and it is positioned adjacent the blanket cylinder 408. The cylinder 416 may be similar to the transport drum 104 of Figure 3, and this cylinder serves to transport sheets of impression paper against the periphery of the blanket cylinder 408 and enables such sheets to receive the inked impressions from the master plates. A paper feeding hopper 418 is provided at one end of the housing 400, and a transfer mechanism 420 is controllable to transfer the sheets of paper from the feeding hopper 418 to the periphery of the transport drum 416. The member 420 is controlled by a solenoid 421 (Figure 8), and it may be similar to the member 162 of Figure 3. The sheets of impression paper, after they have individually received an inked impression from the blanket cylinder 408, are deposited in a suitable paper receiving hopper 422 (Figure 8).

As shown in Figure 8, the feed of master plates from the feeding hopper 402 to the transport drum 404 is controlled by a pneumatic retaining member 430. This member and its control system will be described in detail in conjunction with Figures 9, 13 and 14. It is believed sufficient at present to state that a vacuum pressure is established at the face of the retainer 430 to retain the master plates in the stack 402 against the vacuum pressure of the drum 404 which tends to draw the plates from the feeding hopper. Any interruption of the vacuum pressure at the retainer 430 causes the leading plate in the stack 402 to be fed to the vacuum transport drum 404.

The plates fed to the drum 404 are transported past a series of transducer heads such as the head 432. These heads, like the heads 192, 192a, 192b and 192c of Figure 6, read the identifying information on the master plates and produce control signals in response thereto so as to actuate certain electronic controls associated with the equipment.

A pivotable gate mechanism 434 is positioned between the transport drums 404 and 406. This gate machanism will be described in detail in the description of Figures 10–12. It is pivotable from a first position adjacent the periphery of the drum 406 to the illustrated second position adjacent the periphery of the drum 404. The gate is held in its first position by a pair of coil springs 436 and 438; and it is pivoted to its second position when the energizing winding of a solenoid 440 is energized.

Whenever the solenoid 440 is not energized, the gate 434 is held in its first position against the drum 406, and the master plates fed to the drum 404 are not transferred by the gate but transported around the drum 404 to the stacking hopper 410. Such plates do not reach the transport drum 406, and so they are not inked nor are they brought into engagement with the blanket cylinder 408.

However, when the solenoid 440 is energized, the gate is moved against the drum 404 and it functions to strip a corresponding master plate from the drum 404 and to transfer that plate to the periphery of the drum 406. Any plate so transferred is inked and is brought into engagement with the blanket cylinder 408.

The second plate stacking hopper 412 is angularly displaced a short distance from the adjacent point of the drums 406 and 408 in the direction of rotation of the drum 406. The control member 414 associated with the plate stacking hopper 412 is normally biased in a clockwise direction and held in the illustrated position by a spring 444. When the control member is in its illustrated position, any master plate circulated by the drum 406 is deposited in the hopper 412.

A solenoid 446 is coupled to the control member 414, and when this solenoid is energized, it opposes the biasing action of the spring 444 to pivot the control member away from the drum 406. Therefore, when the solenoid 446 is energized, the plates circulated by the drum 406 are circulated past the hopper 412 and back to the gate 434. When the solenoid 440 associated with the gate is not energized, the gate is biased against the drum 406 as previously described. This causes the master plate to be returned to the drum 404 and to be deposited in the stack 410. However, when the solenoid 446 is not energized, the control member 414 is pivoted to the illustrated position and any master plate circulated by the transport drum 406 is deposited in the stacking hopper 412. The hopper 412 and its transfer mechanism will be described in detail in the description of Figure 12.

It may be seen, therefore, that when the vacuum pressure is removed from the retainer 430 the master plates from the feeding hopper 402 are continuously and successively fed to the vacuum transport drum 404. Such plates are transported by the drum 404 and are transferred to the drum 406 by the gate 434 if the solenoid 440 is energized. Then each plate is transported by the drum 406 into engagement with the blanket cylinder 408 to make an inked impression on that cylinder.

In the described manner, the solenoid 421 is successively energized so that the member 420 feeds sheets of impression paper from the feeding hopper 418 to the transport drum 416. This actuation is timed for proper registration of the sheets with the impressions on the blanket cylinder. The master plates are transported to the stacking hopper 412 and are deposited in that hopper if the solenoid 446 is not energized, and the printed duplicates are transported to the paper receiving hopper 422.

In the mode of operation of the apparatus described above, it functions in a manner similar to that of the previous embodiment and is capable of providing a single duplicate for each of a series of master plates and on a non-selective basis.

When selection is desired, the gate 434 may be controlled by controllably energizing the solenoid 440 to transfer selected ones only of the plates from the transport drum 404 to the transport drum 406. Each selected plate may then be circulated around the drum 406 for as many times as is desired, and a duplicate may be made for each revolution. This provides a selected number of duplicates for selected ones of the master plate. When the desired number of duplicates has been made, the master plate being processed may then be received by the stacking hopper 412 by deenergizing the solenoid 446, or it may be received by the stacking hopper 410 by energizing the solenoid 446 and de-energizing the solenoid 440.

It is evident in the latter mode of operation that the master plates may be fed by the drum 404 from the feeding hopper 402 to the stacking hopper 410 in succession until the plate is reached from which duplications are to be made. The feed of plates from the feeding hopper 402 is then interrupted until the processing of the selected plate on the drum 406 is completed. The selected plate may then be fed to the output stack 410 in the manner described to retain its original order in the plates from the feeding hopper 402, or else it may be fed to the output stack 412 so that the processed plates are separated from the plates that were not so processed.

As previously noted, the transfer mechanism for the stack 402 and its associated control components are shown in detail in Figures 9, 13, 14 and 15. The equipment of these figures is similar to that described and claimed in copending application Serial No. 552,506, which was filed December 12, 1955, in the name of Hans M. Stern entitled "Card Processing Apparatus," and which is assigned to the assignee of the present application.

As illustrated in Figure 9, the master plates 220 are held in a stacked condition in the feeding hopper 402. The leading plate has its forward face disposed against the peripheral surface of the rotating transport drum 404. The vacuum pressure established at the periphery of this drum has a tendency to withdraw the leading plate from the stack 402. However, the retainer 430 extends across the mouth of the hopper 402 from its leading edge with respect to the direction of rotation of the drum 404, and this retainer has a conduit 450 which extends through it and terminates at the face of the retainer in a series of orifices 451 which are disposed adjacent the rear surface of the leading plate. So long as a vacuum pressure is established at the orifices 451, the tendency for the leading plate to be removed from the hopper by the drum 404 is overcome.

It is contemplated in this embodiment that large size masters may be used in some applications. With such large size masters, it is preferable that the illustrated feed including the retainer 430 be replaced with a feed similar to that including the rocker arm 420 illustrated as being used at the paper feeding station. Such a rocker arm is indicated at 431 in Figure 7.

A pipe line 452 extends from the retainer 430 to a housing 454. This pipe line communicates with the conduit 450 in the retainer at one end, and the other end of the line communicates with the interior of the housing 454. The housing 454 has a line 456 communicating with the atmosphere. The housing also has a pair of apertures 458 and 460 at its opposite ends which also communicate with the atmosphere, and it has a pipe line 462 which extends to a suitable vacuum pump, not shown.

The housing 454 contains an internal piston valve system such as is shown in Figures 13, 14 and 15. A conduit 800 (Figures 13 and 14) extends across the housing 454 between the aperture 458 and the aperture 460. A bushing 802 is threaded into the aperture 458 and a bushing 804 is threaded into the aperture 460. A piston 806 is adapted to be slidable in the conduit 800. This piston has a central portion of reduced diameter, and its end portions have a diameter corresponding to the internal diameter of the conduit 800. The piston, therefore, has its end portions in essentially air-tight relation with the wall of the conduit 800.

A first coil spring 808 is positioned in the conduit 800, and this spring bears against the bushing 802 and the end of the piston 806. The spring 808 tends to urge the piston away from the aperture 458. A second coil spring 810 is positioned in the conduit 800. This second coil spring bears against the bushing 804 and against the end of the piston 806, and it tends to bias the piston away from the aperture 460.

An apertured plate 812 is seated in the wall of the conduit 800 between the end of the piston 806 and the bushing 802. This plate limits the movement of the piston in a direction towards the aperture 458. An apertured plate 814 is seated in the wall of the conduit 800 between the piston and the bushing 804. This latter plate serves to limit the movement of the piston in the direction of the aperture 460.

A first passageway 816 extends transversely to the conduit 800. This passageway communicates with the conduit at a point substantially mid-way its ends, and the passageway also communicates with the line 452. The atmosphere line 456 communicates with the conduit 800 at a point between the passageway 816 and the aperture 458. A second passageway 818 extends across the housing 454 essentially parallel to the conduit 800. The passageway 818 communicates at one end with the line 462 extending to the vacuum pump.

A passageway 820 connects the passageway 818 to the conduit 800 at a point adjacent to bushing 802. A passageway 822 connects the passageway 818 to the conduit 800 at a point adjacent the bushing 804. A further passageway 824 connects the passageway 818 to the conduit 800 at an intermediate point displaced from the passageway 816 in the direction of the aperture 460.

When the aperture 460 is closed and the aperture 458 is open, the condition shown in Figure 13 obtains. In this condition, the vacuum pressure in the line 462 draws the air from the closed end of the conduit 800 through the passageway 822. This creates a pressure differential between the closed end of the conduit 800 and the open end so that the piston 806 is drawn down against the plate 814.

The piston 806 is held in the illustrated position of Figure 13 as long as there is vacuum pressure in the line 462, and as long as the aperture 460 is closed and the aperture 458 is open. When the piston is in this position the line 462 is coupled to the line 452 through the passageways 818 and 824, across the conduit 800 by virtue of the restricted center portion of the piston, and through the passageway 816.

On the other hand, when the aperture 458 is closed and the aperture 460 is open, the vacuum line 462 draws air from the closed end of the conduit 800 through the passageways 820 and 818. This creates a pressure differential and causes the piston to move against the plate 812 to the position shown in Figures 14 and 15.

The piston 806 is held in its latter position as long as the aperture 458 is closed and the aperture 460 is open, and as long as there is vacuum pressure in the line 462. In this position of the piston, the line 452 is opened to the atmosphere through the passageway 816 to the conduit 800, and from there to the atmosphere line 456 which is now uncovered by the piston 806.

The arrangement is such that when the aperture 460 is closed and the aperture 458 is open, the line 452 is coupled to the vacuum line 462. Therefore, the vacuum pressure established in the line 462 by the vacuum pump is transmitted through the line 452 to establish a vacuum pressure at the orifices 451 in the face of the retainer 430. However, when the aperture 458 is covered and the aperture 460 uncovered, the line 452 is coupled to the line 456 which is open to the atmosphere. Under the latter conditions, the vacuum pressure is removed from the line 452 and from the orifices 451 (Figure 9) to permit a plate to be withdrawn from the hopper 402 by the transport drum 404.

A pair of resilient electrically conductive arms 464 and 466 are each supported at one of their ends, and these arms extend across the ends of the housing 454 respectively adjacent the apertures 458 and 460. The arm 464 extends through an air gap in a permanent magnet structure 468, and the arm 466 extends through an air gap in a permanent magnet structure 470.

When an electric current is passed through the arm 464, the resulting magnetic field around the arm reacts with the magnetic field in the air gap of the permanent magnet 468 to move the arm 464 downward thereby to close and seal the opening or aperture 458. Likewise, whenever an electric current flows through the arm 466, the resulting magnetic field around that arm reacts with the magnetic field in the air gap of the permanent magnet 470 so that the arm 466 moves downwardly to close and seal the aperture 460.

A resistor 470a (Figure 9) connects the supported end of the arm 464 to the positive terminal of a source of direct voltage 472. A similar resistor 474 connects the fixed end of the arm 466 to the positive terminal of the source 472. The anode of a vacuum tube 476 is connected to the other end of the arm 466, and the anode of a vacuum tube 478 is connected to the other end of the arm 464. The cathode of the tube 476 is connected to ground, and the control grid of this tube is connected to one terminal of a resistor 480, the other terminal of this resistor being connected to the negative terminal of the source 472. Likewise, the cathode of the vacuum tube 478 is connected to ground, and the control grid of this tube is connected to a resistor 482 which, in turn, is connected to the negative terminal of the source 472.

A flip-flop 484 has its left output terminal connected to the control grid of the tube 476, and the flip-flop has its right output terminal connected to the control grid of the tube 478.

Whenever the flip-flop 484 is triggered to its "true" state, a relatively high voltage appears at its left output terminal and a relatively low voltage appears at its right output terminal. This causes the tube 476 to be conductive with a resulting current flow through the arm 466, and it causes the tube 478 to be nonconductive so that there is no current flow through the arm 464. This causes the arms to take on their illustrated position in Figures 9 and 13 in which the aperture 460 is sealed and the aperture 458 is open. This, as previously described, causes a vacuum pressure to be established at the orifices 451 through the line 452. Therefore, as long as the flip-flop 484 is in its "true" state, the master plates are retained in the feeding hopper 402.

Whenever it is desired to transfer a master plate from the feeding hopper 402 to the periphery of the drum 404, the flip-flop 484 is triggered to its "false" state. This causes the tube 476 to become nonconductive and the tube 478 to become conductive. Therefore, a current is initiated through the arm 464, and the current through the arm 466 is terminated. This causes the arms to reverse their positions so that the aperture 458 is now sealed and the aperture 460 is opened. Now, the vacuum pressure is removed from the line 452 and from the orifices 451 to permit a master plate to be transferred from the feeding hopper 402 to the periphery of the transport drum 404.

Therefore, whenever it is desired to transfer a master plate to the drum 404, the flip-flop 484 is triggered to its "false" state. This triggering may be long enough to release a single plate, or the flip-flop may be held in its false state until all the plates are transferred from the feeding hopper 402 in succession to the periphery of the drum 404. The actual control of the flip-flop 484 in a particular control system will be described in conjunction with Figure 16.

The particular construction shown in Figures 10 and 11 for the gate 434 of Figure 8 is a mechanically pivotable type. However, when so desired, this particular type of gate may be replaced by others. For example, the pneumatic gate structures disclosed and claimed in copending application Serial No. 562,154, filed January 30, 1956, in the name of Stuart L. Peck et al., may be used for this purpose.

The mechanical gate shown in Figures 10 and 11 includes a base 500 which supports a C-shaped brace 502. The brace is fastened to the base by a series of studs 504. A pin 506 extends through a rod 508 and through the legs of the brace 502. The spring 438 is supported between the rod 508 and a fixed wall such as that indicated 510 in Figure 10. Similarly, the spring 436 is supported between the rod 508 and a fixed wall 512. The springs 436 and 438 are disposed on opposite sides of the rod 508 so that one of the springs will be subjected to tension by a lateral movement of the rod at the same time that the other spring is subjected to a compressional force.

A post 514 is securely fastened to the pin 506 by a pair of set screws 516 which are threaded into the post and engage a pin 506. The post 514 supports a series of fingers 518 at its outer end, and these fingers taper inwardly as they extend away from the post, preferably, on a symmetrical basis. The fingers 518 are disposed to provide a coupling from the drum 404 to the drum 406 in one position of the gate. In a second pivotable position of the gate, the fingers 518 may be disposed to provide a coupling from the drum 406 to the drum 404, this latter position being illustrated in Figure 10.

The rod 508 carries an armature 520 at its left end in Figures 10 and 11. The armature is actuated by the solenoid 440 to pivot the rod 508 in a counterclockwise direction in Figure 10 whenever the solenoid is energized. The arrangement is such that when the solenoid 440 is not energized, the springs 436 and 438 pivot the rod 508 about the pin 506 in a clockwise direction. This produces a rotation of the post 514 so that the tapered fingers 518 are urged against the drum 406, and portions of these fingers extend into peripheral grooves in this drum. These fingers extend between the drum and any of the master plates that might be carried on its periphery. Therefore, as the drum 406 rotates, such plates are urged along the fingers 518 until their leading edges come under the influence of the drum 404. In this manner, the plates are effectively transferred from the periphery of the drum 406 to the periphery of the drum 404.

On the other hand, when the solenoid 440 is energized, the arm 508 is pivoted to bring the fingers 518 against the periphery of the drum 404. This latter condition is shown in Figure 10. Then, as a plate is transported on the periphery of the drum 404 against the fingers 518, such a plate is urged along the fingers 518 and onto the peripheral surface of the drum 406.

A gate of the general type described above is disclosed, for example, in copending application Serial No. 566,404, which was filed February 20, 1956, in the name of Jerome B. Wiener, entitled "Card Processing System," and which is assigned to the assignee of the present application.

It is evident, therefore, that so long as the solenoid 440 is not energized, the gate 434 is biased against the periphery of the drum 406. Therefore, the master plates transported on the periphery of the drum 404 are not transferred by the gate 434 to the drum 406 so long as the solenoid is not energized. However, when the solenoid 440 is energized, the gate 434 is pivoted into engagement with the periphery of the drum 404. This enables the plates transported on the periphery of the drum 404 to be transferred to the periphery of the drum 406.

Details of the plate stacking hopper 412 of Figure 8 and its controllable transfer mechanism are more particularly shown and in greater detail in Figure 12. This hopper transfer mechanism may be similar to the stack and transfer mechanism disclosed and claimed in copending application Serial No. 571,088, which was filed March 12, 1956, in the name of Minoru T. Endo, entitled "Card Processing Apparatus," and which is assigned to the present assignee.

The stacking hopper 412 (Figure 12) is disposed in contiguous relationship to the periphery of the drum 406, as noted above. The hopper includes a first wall 530 disposed in a direction substantially perpendicular to the periphery of the drum 406, in essentially radial relation with the drum. At a position near the drum, the wall 530 extends at an oblique angle in a direction towards the adjacent drum 408. The oblique portion of the wall 530 is indicated at 532 in Figure 12.

The other wall of the stacking hopper 412 is defined in part by a control member 414 referred to previously. The control member has a first wall 536 disposed in substantially parallel relationship with the wall 530 and spaced from the wall 530 a distance corresponding substantially to the length of the master plates. The wall 536 is integral with an oblique wall portion 538, this oblique wall portion being substantially parallel to the oblique wall portion 532.

The oblique wall portion 538 extends to the periphery of the drum 406, and this wall portion has a series of fingers 540 which are formed integral with it and which extend arcuately along a portion of the drum 406 within peripheral grooves in that drum. These fingers extend substantially across the length of the mouth of the stacking hopper. At their forward ends, the fingers 540 are bent to form pawls 542. The pawls are bent to bulge outwardly from the periphery of the drum 406. The forward ends of the pawls extend back into the grooves in the drum.

The control member 414, as previously described, is pivotable about a pin 415 at a position near the wall 538. The control member 414 has an arm 546 which extends in a direction away from the wall 538. The armature 548 of the solenoid 446 is attached to the arm 546 at its outer end. One end of the spring 444 (which was described previously) is attached to the arm 546, and the other end of the spring is attached to a suitable post 550 having a fixed position.

When the solenoid 446 is not energized, the spring 444 pivots the control member 414 in a clockwise direction about the pivot pin 415. When the control member is so pivoted, it causes the pawls 542 to assume a position within peripheral grooves in the drum 406. The pawls 542 move with the fingers 540, and the leading edges of the pawls 542 become disposed in the peripheral grooves. In this position, the pawls are able to remove the plates from the periphery of the drum 406. This position is shown in Figure 12.

Therefore, as a master plate transported on the periphery of the drum 406 reaches the pawls 542 when they are in the position illustrated in Figure 12, the leading edge of this plate is forced up over the pawls and the plate rides along until it engages the wall 538. The trailing edge of the plate in this position projects over the top of the pawls 542. Therefore, the next plate to be transported by the periphery of the drum 546 rides up on the pawls under the preceding plate and it also is forced along until it engages the wall 538. In this manner, the plates become disposed in the feeder hopper 412 and in the order related to the sequence of their movements on the drum 406. The plates become stacked in the proper order by the action of the pawls 542, as noted above.

Therefore, so long as the solenoid 446 is not energized, the hopper 412 functions in its normal function as a stacking hopper. However, when the solenoid 446 becomes energized, it causes the armature 548 to pivot the control member 414 about the pin 415 and against the bias of the spring 444. The pivotal movement of the control member 414 causes the fingers 540 and the pawls 542 to move up out of the slots in the drum 406. This enables the master plates transported on the periphery of the drum to have a clear path for movement with the drum past the stacking hopper 412. Therefore, by selectively energizing the solenoid 446, the plates on the periphery of the drum 406 can be controllably transferred to the stacking hopper 412 or pass under it.

Under certain circumstances, and when the masters are relatively large, the stack 412 may be a gravity type instead of the above described type of Figure 12. In the gravity type of stack, a controllable knife-edge is brought into engagement with the periphery of the drum 406 when a master is to be removed. The removed master is then guided through rollers and allowed to fall into a suitable receptacle. Such a receptacle is indicated at 412 in Figure 7.

In the control system of Figure 16, the master plates 220, as transported by the drum 404, are first processed by a series of transducer heads such as the heads 432, 432a, 432b and 432c. As in the previous embodiment, it is to be understood that the number of heads corresponds to the number of digits in the identifying information on each master plate. The heads 432, 432a and 432b are connected respectively to amplifiers 600, 602 and 603. The amplifier 600 is connected to the left input terminal of a flip-flop 604 and to an inverter 606. The output terminal of the inverter is connected to the right input terminal of the flip-flop 604.

The amplifier 602 is connected to the left input terminal of a flip-flop 608. This amplifier is also connected to an inverter 610 which, in turn, is connected to the right input terminal of the flip-flop 608. In like manner, the amplifier 603 is connected to the left input terminal of a flip-flop 612 and to the input terminal of an inverter 614. The output terminal of the inverter is connected to the right input terminal of the flip-flop 612. The left and right output terminals of the flip-flops 604, 608 and 612 are all connected to a comparator 616. A static register 618 is also connected to the comparator 616.

The portion of the control system of Figure 16 thus far described is similar to that of Figure 6. It might also be pointed out that the constructional details of the comparator 616 and of the static register 618 may be identical to the corresponding units 252 and 254 of the former system. The comparator 616 has a first output lead 620, a second output lead 622 and a third output lead 624. The output leads 620 and 622 are connected to an "OR" network 626 which, in turn, is connected to an "OR" network 628. A pulse appears on the lead 620 when the identifying data on a master is less than that set up on the static register, a pulse appears on the lead 622 when such identifying data is greater, and a pulse appears on the lead 624 when it is equal.

The "OR" network 628 is connected to the right input terminal of the flip-flop 484, and this "OR" network is connected through a delay line 630 to the left input terminal of that flip-flop. The flip-flop 484 was described in conjunction with Figure 9 as controlling the transfer mechanism associated with the plate feeder hopper 402.

The lead 624 from the comparator 616 is connected through a delay line 631 and through an "OR" network 633 to the left input terminal of a flip-flop 632. This lead is also connected to a delay line 634 which is connected to the right input terminal of the flip-flop 632. The left output terminal of the flip-flop 632 is connected to the control grid of a vacuum tube 636. The cathode of the tube 636 is connected to ground, and the control grid of the tube is connected to a resistor 638 which, in turn, is connected to the negative terminal of the source 472. The anode of the tube 636 is connected to one terminal of the energizing winding of the solenoid 440 which controls the gate 434 in the manner described. The other terminal of this winding is connected to a resistor 640, which in turn is connected to the positive terminal of the source 472.

The lead 624 is also connected to a delay line 640, and this delay line is connected to an "OR" network 644. The "OR" network is connected to the control grid of a vacuum tube 646, and this control grid is connected to a resistor 648. The resistor 648 is connected to the negative terminal of the source 472. The cathode of the tube 646 is connected to ground, and the anode of the tube is connected to one terminal of the energizing winding for the solenoid 421, which controls the paper feed member 420 in the described manner. The other terminal of the winding 421 is connected to a resistor 650 which, in turn, is connected to the positive terminal of the source 472.

The switches 403, 411 and 413 associated with the respective hoppers and previously described in conjunction with Figure 8 are connected in parallel between the positive terminal of the source 472 and a capacitor 652. These switches are normally in an open condition and are of the single-pole-single-throw type. The capacitor 652 is connected to a delay line 653 which, in turn, is connected to a stop relay 654. The stop relay controls the drive motor 656 of the system.

The stop relay includes a push-button switch 658 for manually stopping the drive motor, and it also includes a push-button switch 660 for manually starting the motor. This drive motor produces rotation of the drums 404, 406, 408 and 416 (Figure 8). Whenever any of the switches 403, 411 and 413 is closed, the resulting pulse from the capacitor 652 causes the relay 654 to stop the drive motor 656 after a predetermined delay by the line 653 and, therefore, to stop the rotation of the transport drums.

Like the head 192c of Figure 6, the transducer head 432c reads a "1" which is recorded in the lower row of each master plate. The head 432c is connected to the input terminal of an amplifier 662. The output terminal of the amplifier is connected to the left input terminal of a flip-flop 663. The amplifier is also connected to a delay line 665, which is connected to the right input terminal of the flip-flop. The left output terminal of the flip-flop is connected to an "AND" network 667, as is the output lead 624 from the comparator 616. The "AND" network 667 is connected to a transducer write head 664 associated with a memory unit 666. This memory unit may be similar in its construction to the one described and claimed in copending application Ser. No. 606,456, filed August 27, 1956, by Jerome B. Wiener. That is, it may include a rotatable drum 668 which is driven in synchronism with the drum 404. The surface of the drum 668 is composed of magnetic material, so that data may be recorded on the drum 668 by the transducer head 664.

A transducer read head 670 is associated with the drum 668, and this latter head is adapted to read the date magnetically recorded on the drum by the head 664. The transducer head 670 is connected to the input terminal of an amplifier 672, and the output terminal of this amplifier is connected to a binary counter 674. This binary counter is constructed in accordance with well known practice so as to provide an output pulse after a selected number of input pulses, this selected number being manually controllable.

The output terminal of the binary counter 674 is connected to the right input terminal of a flip-flop 676 and through a delay line 678 to the left input terminal of this flip-flop. The right output terminal of the flip-flop 676 is connected to an "AND" network 680, as is a source of erase signals 682. The output terminal of the "AND" network 680 is connected to a transducer erase head 684 associated with the drum 668 of the memory unit 666. It will be noted that the read head 670 is displaced about the drum 668 in the direction of rotation from the write head 664, and that the erase head 684 is displaced around the drum in the direction of rotation from the read head 670.

The output terminal of the binary counter 674 is also connected to the movable arm of a single-pole-single-throw switch 685. The fixed contact of this switch is connected to the left input terminal of a flip-flop 686 and through a delay line 688 to the right input terminal of this flip-flop. The right output terminal of the flip-flop 686 is connected to the control grid of a tube 690. The cathode of this tube is connected to the ground, and its control grid is connected to one terminal of a resistor 692, the other terminal of which is connected to the negative terminal of the source 472 of direct voltage. The anode of the tube 690 is connected to one terminal of the energizing winding of the solenoid 446 associated with the plate stacking hopper 412. The other terminal of this winding is connected to a resistor 694 which, in turn, is connected to the positive terminal of the source of direct voltage 472.

The amplifier 672 is further connected through a delay line 673 to an "AND" network 696, as is the left output terminal of the flip-flop 676. The "AND" network 696 is connected to a delay line 698 which, in turn, is connected to the "OR" network 644. In addition, the amplifier 672 is connected to a delay line 695. The output terminal of the delay line 695 and the left output terminal of the flip-flop 676 are connected to an "AND" network 697. The output terminal of the "AND" network 697 is connected to the movable arm of a single-pole-single-throw switch 699. The fixed contact of the switch 699 is connected to the "OR" network 633.

The system includes a manual start switch 700. This switch is of the single-pole-single-throw type. The fixed contact of the switch 700 is connected to the positive terminal of the source of direct voltage 472. The movable arm of this switch is connected to a capacitor 702 which, in turn, is connected to a differentiator 704. The output terminal of the differentiator 704 is connected to the "OR" network 628.

The apparatus of Figures 7 and 8 may be operated in a first mode in which each master plate from the feeding hopper 402 is to be duplicated with a single duplicate and in which the masters are then to be stacked in the stacking hopper 412.

For this first mode of operation, the static register 618 is set so that a pulse is produced on the output lead 624 of the comparator 616 each time a master plate is scanned by the heads 432, 432a and 432b. That is, each master plate produces an output pulse on the lead 624, regardless of the particular identifying information on that plate. One convenient way of accomplishing this is to have a suitable switch position for the manual controls of the static register in which the register itself is disconnected from the comparator and the flip-flops 604, 608 and 612 are connected to both sides of the comparator. Such a connection will provide a pulse on the "equal" lead 624 regardless of the actual condition of the individual flip-flops. Another way would be to include switches such as the switches 257 and 259 of Figure 6, in the leads 620 and 622 from the comparator. These switches would enable all three output leads from the comparator to be connected through an appropriate "OR" network to the units 631 and 640.

Also, for the mode of operation discussed above, the switch 699 is opened and the switch 685 is closed. To initiate the cycle of operations, the start switch 700 is depressed. This produces a transient pulse across the capacitor 702, and this pulse is sharpened by the differentiator 704. The sharpened pulse from the differentiator is impressed on the right input terminal of the flip-flop 484 through the "OR" network 628 to trigger the flip-flop to its false state. This causes the tube 478 to be conductive and the tube 476 to be non-conductive. This condition of the tubes 476 and 478 persists long enough to enable the retainer 430 (Figure 8) to release a master plate to the drum 404 in the manner previously described. The flip-flop 484 is then returned to its true state by the output pulse from the delay line 630 after a single master plate has been so released.

The released master plate is transported on the periphery of the drum 404 past the transducer heads 432, 432a and 432b to produce a pulse on the output lead 624 of the comparator in the manner described above. The pulse on the lead 624 is introduced through the delay line 631 and through the "OR" network 633 to the left input terminal of the flip-flop 632. This causes the flip-flop 632 to be triggered to its true state as the plate approaches the gate 434. When the flip-flop 632 is in its true state, the tube 636 is conductive and the solenoid 440 is energized to draw the gate to the illustrated position in Figure 8 against the drum 404. The master plate is, therefore, transferred by the gate to the periphery of the drum 406. When this transfer is completed, the output pulse from the delay line 634 returns the flip-flop 632 to its false state. The tube 636 is, therefore, returned to its non-conductive condition, and the solenoid 440 is de-energized so that the gate 434 is pivoted back against the drum 406. The master plate is now transported by the drum 406 past the inking stations and past the blanket cylinder 408 (Figure 8). An inked impression of the master is, therefore, made on the blanket cylinder.

The pulse produced on the output lead 624 by the master plate is also passed through the delay line 640 and through the "OR" network 644 to the control grid of the tube 646. This causes a pulse of current to flow through the tube which causes the solenoid 421 to be energized and pivot the member 420 so as to feed a sheet of paper onto the paper transport drum 416. The timing by the delay network 640 is such that the sheet of paper is properly registered with the inked impression on the blanket cylinder 408 from the master plate on the drum 406.

The master plates on the drum 404 are all carried by the drum past the transducer head 432c. This transducer head, as previously noted, reads the magnetic pulse having a polarity corresponding to "1" which is recorded on the lower right hand corner of each master plate 220. The resulting output pulse from the head 432c is amplified by the amplifier 662 and triggers the flip-flop 663 to the true state. The flip-flop remains in its true state for a sufficient time so that a pulse produced by the comparator 616 on the output lead 624 is passed by the "AND" network 667 to the write head 664. A pulse is recorded on the drum 668 by the write head 664. Therefore, each time a plate is transferred to the drum 406, a pulse is recorded on the memory drum 668 by the write head 664. This recorded pulse is subsequently read by the transducer read head 670 and is amplified by the amplifier 672. The pulse is read by the head 670 after a period of time corresponding to that required for the plate transferred by the drum 406 to be transported by that drum past the blanket cylinder 408.

The amplified pulse from the amplifier 672 is introduced to the binary counter 674. For this mode of operation, the binary counter is set to "1." That is, the counter produces an output pulse for each input pulse introduced to it. Furthermore, the counter counts only to a value of "1" and then starts a new count from a value of "0." The resulting output pulse of the binary counter is introduced through the "OR" network 628 to the left input terminal of the flip-flop 484 to trigger the flip-flop to its true state. This causes a second master plate to be released by the feeding hopper 402 to the periphery of the vacuum transport drum 404 in the previously described manner.

The output pulse from the binary counter is also impressed on the right input terminal of the flip-flop 676 to trigger that flip-flop to its false state. This conditions the "AND" network 680 to translate erasing signals from the source 682 to the head 684. The delay line 678 introduces a pulse to the left input terminal of the flip-flop 676 to return the flip-flop to its true state after a time corresponding to that required for the erasing signals to remove the pulse from the memory drum 668.

The amplified pulse from the amplifier 672 is also introduced through the delay line 673 to the "AND" network 696. However, the delays of the delay lines 673 and 678 are so related that the flip-flop 676 is still in its false state when the pulse from the delay line 673 reaches the "AND" network 696. Therefore, the "AND" network 696 does not translate the pulse.

The amplified pulse from the amplifier 672 is also introduced through the delay line 695 to the "AND" network 697. However, regardless of the condition of this "AND" network, the pulse in this latter path is ineffectual because the switch 699 is open.

The output pulse from the binary counter 674 is also introduced to the left input terminal of the flip-flop 686, the switch 685 being closed. This triggers the flip-flop to its true state and causes the tube 690 to be non-conductive. When the tube 690 is non-conductive, the solenoid 446 is de-energized and the master plate is received by the stacking hopper 412 in the previously described manner.

Therefore, each master plate from the feeding hopper 402 is transported by the drum 404 to the gate 434, and it is then transferred to the drum 406 and circulated by the latter drum past the blanket cylinder 408 to be deposited in the stacking hopper 412.

In a second mode of operation, the master plates may undergo exactly the same sequence of operations as in the first mode except that they are stacked in the stacking hopper 410 (Figure 8) instead of the hopper 412. This is achieved by opening the switch 685 so that the solenoid 446 is continually energized to pivot the control member 414 away from the drum 416 in the manner described. Then, the master plates are successively transported by the drum 406 past the hopper 412 and back to the gate 434. The timing (as established by the memory 666 and the delay line 695) is such that each master plate after it has been completely processed reaches the gate 434 before the next succeeding master plate from the feeding hopper 402 causes the gate to be pivoted down on the drum 404. Therefore, the processed master plates pass through the gate 434 back to the drum 404 and to the stacking hopper 410 just before the respective succeeding plates from the feeding hopper 402 pivot the gate 434 down on the drum 404.

In a third mode of operation of the system, a plurality of duplicates may be made of each master plate. To achieve this, it is merely necessary to close the switch 699 and to set the binary counter 674 to a count corresponding to the number of duplicates required. The switch 685 is opened or closed depending on which stacking hopper (410 or 412) is to receive the masters after they are processed. The output pulse from the amplifier 672, as before, is introduced to the delay lines 673 and 695.

The pulse from the delay line 673 passes through the "AND" network 696 to release a second sheet of paper from the paper feeding hopper 418 (Figure 8). The sheet is released at the proper time to receive the inked impression of the master on the blanket cylinder, as the master circulates its second time around the drum 406. This proper timing, as before, is established by the delay line 698 which is preferably manually adjustable.

The pulse from the delay line 695 passes through the "AND" network 697, through the switch 699 and through the "OR" network 633 to the left input terminal of the flip-flop 632. The pulse, therefore, triggers the flip-flop 632 at the proper time (as established by the delay line 695) to cause the gate 434 to be pivoted (in the manner described) away from the drum 406 as the master plate on that drum approaches the gate. This permits the plate to continue to circulate on the drum.

The amplified pulse from the amplifier 672 is also introduced to the binary counter 674, but in the absence of an output pulse from the binary counter, the flip-flop 676 remains in its true state. Therefore the "AND" networks 696 and 697 are in a condition for translation to permit the paper release and gate pivoting described in the preceding paragraphs. Also, the "AND" network 680 does not pass the erasing signals from the source 682 to the erasing head 684 associated with the memory drum 668. Furthermore, in the absence of a pulse from the binary counter, no pulse is fed to the flip-flop 686 so that the transfer mechanism for the hopper 412 is held in its inoperative position.

Therefore, in the latter mode each plate circulates a predetermined number of times on the drum 406 past the hopper 412 and, for each circulation, a memory pulse appears from the read head 670 at the output of the amplifier 672. This pulse causes a new sheet of paper to be released from the paper feeding hopper 418 in properly timed relation to receive its impression from the blanket cylinder. The pulse also causes the gate 434 to pivot out of the way of the plate circulating on the drum.

After the desired number of duplicates have been made, the binary counter 674 produces an output pulse. Also, and in the manner previously described, the pulse on the memory drum 668 is erased; the master plate is selected either by the hopper 412 or by the hopper 410 (depending on whether the switch 656 is closed or open); and the next succeeding master plate is released from the feeding hopper 402 to the drum 404.

It might be noted that when the binary counter 674 produces an output pulse, the flip-flop 676 is triggered to its false state, so that the "AND" network 697 is no longer conditioned for translation. Therefore, the pulse from the delay line 695, after the full count in the binary counter, does not cause the gate 434 to be pivoted. This allows the master plate to be returned to the hopper 410, if such is desired.

For a further mode of operation, the static register 618 may be set (as in the previous embodiment) to produce a pulse on the output lead 624 of the comparator 616 only for certain predetermined ones of the master plates. For the other master plates, pulses are produced on the output leads 620 and 622 of the comparator which trigger the flip-flop 484 to release the next succeeding master plate. The master plates, therefore, are continuously released and circulated on the drum 404 to the output stack 410. When one of the selected plates is reached, its identifying number corresponds to the one set up in the static register, and a pulse appears on the lead 624 of the comparator. The gate 434 is therefore, pivoted down on the drum 404 in the manner described to transfer that plate to the drum 406. As previously noted, switches such as the switches 257 and 259 of Figure 6, can be included in the leads 620 and 622 to render the system more flexible.

The selected master plates may be treated as in the previous modes to provide one or more printed duplications. Also, as in the previous modes, these plates can be fed to the stacking hopper 412 or they can be returned to the stacking hopper 410.

The switches 403, 411 and 413 in the various hoppers serve to stop the system whenever certain conditions occur. For example, the switch 403 closes when the plate feeding hopper 402 is empty and, after a time established by the delay line 653 corresponding to the time required to process the last plate, the resulting pulse appearing across the capacitor 652 is introduced to the relay 654 to stop the drive motor 656.

In like manner, when either of the stacking hoppers 410 or 412 become too full, the associated switch 411 or 413 closes to stop the system.

The invention provides, therefore, an improved data processing system which enables discrete master plates to be selected and processed so as to provide one or more duplicates of each, or of selected ones, of the plates.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. Duplicating apparatus for use with a plurality of discrete members each having an image formed thereon of information to be duplicated, including, a rotatable drum constructed to have a vacuum pressure established at its peripheral surface, means for producing a vacuum pressure at the peripheral surface of the drum, means for individually feeding the discrete members to the peripheral surface of said drum to be transported by said drum, means for contacting the discrete members transported by said drum for providing a duplicate of the image formed thereon, a static register adjustable to any desired setting for representation of particular information desired to be obtained from the discrete members, comparator means responsive to the signal information from the transported discrete members and to the setting of the static register for providing a comparison at any instant of the signal information and the register setting to produce control signals in accordance with the results of such comparison, and control means responsive to the control signals and operative upon the contacting means to cause the information on only selected ones of the discrete members to be duplicated in accordance with the results of the comparison.

2. Duplicating apparatus for use with a plurality of master plates each having an image formed thereon of information to be duplicated and for use with a medium for receiving the image from the master plates, including, a feeder hopper for holding in a stacked condition the master plates, a first rotatable drum constructed to have a vacuum pressure established at its peripheral surface, means for establishing a vacuum pressure at the peripheral surface of the drum to hold the plates in fixed positioning on the peripheral surface of the drum, transfer means for individually feeding the master plates from said feeder hopper to the peripheral surface of said drum to be transported by said drum, a second rotatable drum disposed in tangential relation with said first drum to contact the master plates transported thereby and to receive impressions of the respective images formed thereon, a third rotatable drum disposed in tangential relation with said second drum and constructed to receive a vacuum pressure at its peripheral surface from the vacuum means, static register means adjustable to any desired setting in accordance with particular information to be obtained from the master plates, electrical comparison circuitry responsive to the setting of the static register and to the signal information on the master plates for comparing the register setting and the signal information to produce control signals representing the results of such comparison, means responsive to the control signals for controlling the transfer to the second drum of the signal information on the plates being transported by the first drum and for controlling such transfer in accordance with the results of the comparison, and a transfer mechanism disposed in coupled relationship to the third drum for feeding to the peripheral surface of said third drum the medium to bring the medium into contact with the impressions on said second drum for a transfer of the impressions to the medium.

3. Duplicating apparatus for use with a plurality of master plates each having an image formed thereon of information to be duplicated and for use with a medium for receiving the image on the master plates, including, a first feeder hopper for holding in a stacked condition the plates, a first rotatable drum constructed to have a vacuum pressure established at its peripheral surface, means for establishing a vacuum pressure at the peripheral surface of the drum, transfer means for individually feeding the master plates from said first feeder hopper to the peripheral surface of said drum to be transported by said drum, a second rotatable drum disposed in contiguous relation with said first drum to contact the master plates transported thereby and to receive impressions of the respective images thereon, a stacking hopper disposed in coupled relationship to the first drum for receiving plates transferred to the drum from the first feeding hopper after the contact of the plates with the second drum, a second feeder hopper for holding the medium, a third rotatable drum disposed in contiguous relation with said second drum and constructed to have a vacuum pressure established at its peripheral surface, a transfer mechanism disposed in coupled relationship to the third drum for feeding such medium in timed relation from said second feeder hopper to the peripheral surface of said third drum for movement with said third drum into contact with said second drum to receive the impressions produced on said second drum, and means disposed in coupled relationship to the first feeder hopper and the stacking hopper and responsive to the transfer of the master plates from the first feeder hopper to the stacking hopper for operating upon the first feeding hopper and the stacking hopper to obtain a return by the first drum of the plates in the stacking hopper to the first feeding hopper.

4. The duplicating apparatus defined in claim 3 and which further includes a control system for said last named transfer mechanism and for said second drum for providing a duplication on the medium of the information on selected ones only of the master plates.

5. Duplicating apparatus for use with a plurality of master plates each having an image formed thereon of information to be duplicated and each having identifying data recorded thereon and for use with a medium for receiving the image on the master plates, including, a first feeder hopper for holding the plates in a stacked condition, a first rotatable drum constructed to have a vacuum pressure established at its peripheral surface for holding the master plates in fixed positioning on the peripheral surface, means for establishing a vacuum pressure at the peripheral surface of the drum, first transfer means for individually feeding the master plates from said first feeder hopper to the peripheral surface of said drum to be transported by said drum, a second rotatable drum disposed in contiguous relation with said first drum to contact the master plates transported thereby and to receive impressions of the respective images thereon, a second feeder hopper for the medium, a third rotatable drum disposed in contiguous relation with said second drum and constructed to have a vacuum pressure established at its peripheral surface by the vacuum means, a second transfer means for feeding such medium in timed relation from said second feeder hopper to the peripheral surface of said third drum to be transported thereby and brought into contact with the impressions on said second drum, transducer means adjacent said first drum for sensing the identifying data on the plates and for producing electrical signals in response thereto, and a control system responsive to such signals for providing a coupled relationship between said second drum and said first and third drums only at particular times to produce a recording on the medium of the information only on selected ones of the master plates.

6. The apparatus defined in claim 5 in which said control system includes adjustable means for providing controllable reference signals and means for comparing said signals from said transducer means with said reference signals to control the coupling of said second drum to said first and third drums for the recording on said medium of the information on selective master plates.

7. In duplicating apparatus for use with a plurality of master plates each having an image formed thereon of information to be duplicated and for use with a medium for receiving the image on the master plates, including, a first feeder hopper for holding the plate in a stacked condition, a first rotatable drum constructed to have a vacuum pressure established at its peripheral surface, means for establishing a vacuum pressure at the peripheral surface of the drum, a first transfer mechanism for individually feeding the master plates from said first feeder hopper to the peripheral surface of said drum to be transported by said drum, a second rotatable drum disposed in contiguous relation with said first drum and constructed to have a vacuum pressure established at its peripheral surface by the vacuum means, gate means controllable to transfer selected ones of the plates transported by said first drum to said second drum to be transported by said second drum, a first stacking hopper contiguous to said first drum for receiving the plates transported by said first drum other than those transferred to said second drum by said gate means, a second stacking hopper contiguous to said second drum for receiving the plates transferred to said second drum and transported by said second drum, a third drum disposed in contiguous relation with said second drum to contact the master plates transported thereby for the reception of the impressions of the respective images thereon, and control means responsive to particular information on the master plates transferred from the first feeder hopper to the first drum for providing a controlled operation of the gate means to obtain the transfer to the second drum of plates having only the particular information on the plates.

8. The apparatus defined in claim 7 which also includes a second feeder hopper for housing the medium, a fourth rotatable drum disposed in contiguous relation with said third drum and constructed to have a vacuum pressure established at its peripheral surface by the vacuum means, and transfer means coupled to the second feeder hopper and responsive to the control means for feeding such medium in timed relation from said second feeder hopper to the peripheral surface of said fourth drum to be transported thereby and brought into contcat with the impressions provided on said third drum.

9. Duplicating apparatus for use with a plurality of master plates each having an image formed thereon of information to be duplicated and for use with a medium for receiving the image on the master plates, including, a first feeder hopper for holding the plates in a stacked condition, a first rotatable drum constructed to have a vacuum pressure established at its peripheral surface for a fixed positioning of the plates on the peripheral surface of the drum, means for establishing a vacuum pressure on the peripheral surface of the drum, a first controllable transfer mechanism for individually feeding the master plates from said first feeder hopper to the peripheral surface of said drum to be transported by said drum, a second rotatable drum disposed in contiguous relation with said first drum and constructed to have a vacuum pressure established at its peripheral surface by the vacuum means, controllable gate means for transferring plates from said first drum to said second drum to be transported by said second drum, a first stacking hopper contiguous to said first drum for receiving the plates transported by said first drum past said gate, a second stacking hopper contiguous to said second drum, a second controllable transfer mechanism for transferring plates from said second drum to said second stacking hopper, a third drum disposed in contiguous relation with said second drum to contact the master plates transported thereby for the reception of impressions of the respective images thereon, control means for actuating said first transfer mechanism to bring the plates onto said first drum, means for actuating said gate means upon the occurrence of selective plates in the plurality to obtain a transfer of the plates to said second drum, and means for actuating said second transfer mechanism after the selective plates have been circulated a particular number of times by said second drum to transfer the plate to said second stacking hopper.

10. The apparatus defined in claim 9 in which the master plates have identifying data recorded thereon and which further includes transducer means adjacent said first drum for sensing the data on the plates to develop electrical signa's in response thereto, means for providing a reference signal adjustable to represent different conditions, and means for comparing said signals from said transducer means with the reference signal to produce a control signal for said gate actuating means.

11. The apparatus defined in claim 9 and which further includes means for sensing each circulation of a plate on said second drum, and adjustable counter means for developing a control signal for said second transfer mechanism after a particular number of such circulations.

12. Duplicating apparatus for use with a plurality of master plates each having an image formed thereon of information to be duplicated and for use with a medium for receiving the image on the master plates, including, a first hopper for storing the plates for transfer, means including a first rotatable drum disposed in coupled relationship to the first hopper for removing the plates from the drum at particular times and for transporting the plates on the drum, means including a blanket cylinder disposed in coupled relationship to the first rotatable drum upon the transfer of particular plates in the plurality to the first drum for producing on the cylinder an image corresponding to the image on the particular plates, means including a second hopper for receiving the plates transferred to the first drum from the first hopper, a third hopper for storing the medium, means including a second drum disposed in coupled relationship to the blanket cylinder and operative upon the transfer of the particular plates to the first drum for removing the medium from the third hopper and for transporting the medium in synchronism with the images on the blanket cylinder to obtain a recording of the images on the medium, and means coupled to the first and second hoppers and responsive to the transfer of the plates from the first hopper to the second hopper for operating upon the hoppers to obtain a return of the plates from the second hopper to the first hopper.

13. Duplicating apparatus for use with a plurality of master plates each having an image formed thereon of information to be duplicated and for use with a medium for receiving the image on the master plates, including, a first hopper for storing the plates for transfer, first transport means disposed in coupled relationship to the first hopper for removing the plates in the plurality from the first hopper for movement by the transport means to positions away from the first hopper, means including electrical circuitry for providing a controlled transfer of the cards from the first hopper to the first transport means, a blanket cylinder for receiving images from the plates carried on the first transport means, means including electrical circuitry for controlling the transfer to the blanket cylinder of the images on particular plates in the plurality, a second hopper for holding the medium, second transport means disposed in coupled relationship to the second hopper for removing the medium from the second hopper for movement by the transport means toward the blanket cylinder, means including electrical circuitry for controlling the transfer of the medium to the second transport means in timed relationship to the transfer of images to the second blanket cylinder for the transfer of the images from the blanket cylinder to the medium, and means including electrical circuitry for controlling the number of images duplicated on the medium from the blanket cylinder for each of the images transferred to the blanket cylinder from the plates.

14. Duplicating apparatus for use with a plurality of master plates each having an image formed thereon of information to be duplicated and for use with a medium for receiving the image on the master plates, including, a hopper for storing the plates for transfer, first transport means disposed in coupled relationship to the hopper for removing the plates in the plurality from the hopper and for transporting the plates from the hopper, means associated with the first hopper and the first transport means for providing for a controlled transfer of the plates from the hopper to the transport means, a register adjustable to provide a selective reading; transducer means responsive to particular information on the plates for producing signal indications in accordance with such particular information, comparator means responsive to the signal indications from the transducer means and to the selective reading from the register to produce control signals upon the occurrence of a particular relationship between the signal information and the selective reading, means including a blanket cylinder disposed in coupled relationship to the first transport means and responsive to the control signals and operative upon the transfer of only selected plates in the plurality to the transport means in accordance with the signal information on the plates and the selective reading of the register to produce on the cylinder an image corresponding to the image on the selected plates, means including second transport means disposed in coupled relationship to the blanket cylinder upon the recording of the images on the blanket cylinder for obtaining a recording on the medium of the images produced on the blanket cylinder, and means for storing the medium after the recording of the images on the medium.

15. Duplicating apparatus for use with a plurality of master plates each having an image formed thereon of information to be duplicated and for use with a medium for receiving the images on the master plates, including, a first feeder hopper for holding the plates in a stacked condition, first transport means for the plates and disposed in coupled relationship to the feeder hopper to receive master plates from the feeder hopper, first transfer control means disposed in coupled relationship to the transport means to provide a controlled and individual transfer of master plates from the feeder hopper to the transport means, second transport means for the master plates and disposed in coupled relationship to the first transport means to receive master plates from the first transport means, controllable gate means disposed in coupled relationship to the second transport means to provide a controlled transfer of plates from the first transport means to the second transport means, a first stacking hopper disposed in coupled relationship to the first transport means for receiving the plates moving past the gate under the control of the first transport means, a second stacking hopper disposed in coupled relationship to the second transport means for receiving the plates transferred by the gate to the second transport means, a blanket cylinder disposed in coupled relationship to the second transport means to receive an impression of the images on the master plates transferred to the second transport means, a static register adjustable to any desired setting, and means responsive to particular information on the master plates transferred to the first transport means and responsive to the register setting for providing a comparison between the particular information and the register setting to obtain a transfer of only selected cards to the second transport means dependent upon the register setting.

16. Duplicating apparatus as set forth in claim 15, including, third transport means for the medium and disposed in coupled relationship to the blanket cylinder for providing a movement of the medium to receive an image from the impression on the blanket cylinder, and means disposed in coupled relationship to the third transport means for providing a transfer of the medium to the third transport means in timed sequence with the transfer of the impression to the blanket cylinder to receive the image from the impression on the blanket cylinder.

17. Duplicating apparatus for use with a plurality of master plates each having an image formed thereon of information to be duplicated and for use with a medium for receiving the image on the master plates, including, a first feeder hopper for holding the plates in a stacked relationship, means including first transport means for the plates and disposed in coupled relationship to the feeder hopper to obtain a transfer of the plates from the feeder hopper to the transport means, a blanket cylinder disposed in coupled relationship to the first transport means and constructed to receive an impression from the plates transferred to the transport means, control means disposed in co-operative relationship with the blanket cylinder for controlling the coupling of the first transport means to the blanket cylinder to obtain a selective production of impressions on the blanket cylinder by the plates on the transport means, a static register adjustable to any setting in accordance with a desired value, and comparator means responsive to particular information on the plates transferred to the first transport means and to the register setting for obtaining a controlled operation of the control means to provide a coupling of only selected plates to the blanket cylinder for the production of an impression on the blanket cylinder.

18. Duplicating apparatus as set forth in claim 17, including, second transport means disposed in coupled relationship to the blanket cylinder for providing a movement of the medium into cooperative relationship with the impression on the blanket cylinder, and means disposed in coupled relationship to the second transport means and responsive to the signals from the comparator means for obtaining a transfer of the medium to the second transport means in timed relationship with the production of impressions on the blanket cylinder to obtain a transfer of the impressions from the blanket cylinder to the medium.

19. Duplicating apparatus for use with a plurality of master plates each having an image formed thereon of information to be duplicated and for use with a medium for receiving the image on the master plates, including, a first feeder hopper for holding the plates in a stacked relationship, first transport means for the plates and disposed in coupled relationship to the plates in the feeder hopper for obtaining a transfer of plates from the feeder hopper and for providing a movement of the plate in closed loops upon such transfer, a blanket cylinder disposed in coupled relationship to the first transport means and constructed to receive an impression from the plates transferred to the transport means from the first feeder hopper upon each movement of the plates, in the closed loop, a stacking hopper disposed in coupled relationship to the first transport means to receive the cards transferred to the first transport means from the first feeder hopper, a second feeder hopper for holding the medium, second transport means for the medium and disposed in coupled relationship to the blanket cylinder for obtaining a transfer of the impressions on the blanket cylinder to the medium, means including transfer means disposed in coupled relationship to the medium in the second feeder hopper and to the second transport means to obtain a transfer of the medium to the second transport means for presentation to the blanket cylinder in synchronous relationship with the presentation of the impression on the blanket cylinder, means including a counter responsive to the movements of each plate in successive closed loops upon the transfer of the plate to the first transport means for providing a count of such movements and for providing an output control signal after a particular number of such movements, means including first control means responsive to the output control signal for providing a movement of the plate on the transport means to the stacking hopper, and means including second control means responsive to the output control signal for providing a transfer of the next plate in the first feeding hopper to the first transport means.

20. The duplicating apparatus set forth in claim 19, including means responsive to the successive movements of each plate on the first transport means in closed loops and coupled to the transfer means for the media to obtain an operation of the transfer means in presenting media to the second transport means for the printing on the media of the impression produced on the blanket cylinder in the successive movements of each plate in closed loops.

21. Duplicating apparatus for use with a plurality of master plates each having an image formed thereon of information to be duplicated and for use with a medium for receiving the image on the master plates, including, a first feeder hopper constructed to hold the plates in a stacked relationship, first transport means for the plates, means disposed relative to the plates in the first hopper for obtaining a controlled transfer of the plates from the hopper to the transport means, second transport means for the plates, gate means disposed relative to the plates on the first transport means for obtaining a controlled transfer of plates from the first transport means to the second transport means, first transfer means including a first stacking hopper disposed relative to the plates on the first transport means at a position past the gate means for obtaining a transfer to the first stacking hopper of the plates retained on the first transport means for movement past the position of transfer to the second transport means, second transfer means including a second stacking hopper disposed relative to the plates on the second transport means for obtaining a controlled transfer of plates from the second transport means to the second stacking hopper, a blanket cylinder disposed in contiguous relationship to the second transport means to contact the master plates on the second transport means for the reception of impressions of the images on the plates, means disposed relative to the gate means and responsive to particular information on the plates on the first transport means to obtain a transfer of selected plates to the second transport means in accordance with such particular information, and means coupled to the second transfer means for operating upon the second transfer means to obtain a transfer to the second stacking hopper of the plates on the second transport means after the movement of the plates a particular number of times past the position of contiguity between the blanket cylinder and the second transport means.

22. Duplicating apparatus for use with a plurality of master plates each having an image formed thereon of information to be duplicated and for use with a medium for receiving the images on the master plates, including, a first feeder hopper constructed to hold the plates in a stacked relationship, means including first transport means for the plates and disposed relative to the feeder hopper to obtain a controlled transfer of the plates from the feeder hopper to the transport means, a blanket cylinder disposed relative to the first transport means and constructed to receive an impression from the plates transferred to the transport means, means including second transport means operative upon the medium in a timed relationship with the transport of the plates and disposed relative to the blanket cylinder to provide for a transfer to the medium of the impression received by the blanket cylinder from the plates on the first transport means, means including a stacking hopper constructed to hold the plates in stacked relationship and disposed to receive the plates transferred to the first transport means from the feeder hopper, and means operatively coupled to the feeder hopper and the stacking hopper for obtaining a transfer of the plates from the stacking hopper to the first transport means for the return of the plates to the feeding hopper and for obtaining such a transfer of the plates from the stacking hopper to the first transport means after the transfer of the plates from the first feeding hopper to the stacking hopper.

23. Duplicating apparatus for use with a plurality of master plates each having an image formed thereon of information to be duplicated and for use with a medium for receiving the image on the master plates, including, a first feeder hopper constructed to hold the plates in a stacked relationship, first transport means for the plates and disposed relative to the feeder hopper to receive master plates from the feeder hopper, first transfer control means disposed relative to the first transport means and to the plates in the feeder hopper to provide a controlled and individual transfer of master plates from the feeder hopper to the first transport means, second transport means for the master plates and disposed relative to the first transport means to receive master plates from the first transport means, gate means operatively disposed relative to the plates on the first transport means for obtaining a transfer of such plates to the second transport means, means including stacking means disposed relative to the first and second transport means for obtaining a transfer to the stacking means of the transported plates on the first and second transport means past the position of transfer of the plates from the first transport means to the second transport means, a blanket cylinder disposed relative to the second transport means to receive an impression of the images on the master plates transferred from the first transport means to the second transport means, means including third transport means disposed relative to the blanket cylinder for providing a transport of the medium to the blanket cylinder to obtain a transfer to the medium of the images transferred to the blanket cylinder from the master plates on the second transport means, and means operatively coupled to the stacking means and the feeder hopper for obtaining a return of the plates from the stacking means to the second and first transport means for movement of the plates to the feeder hopper and for obtaining such a transfer upon the transfer of all of the plates in the feeder hopper to the stacking means.

24. Duplicating apparatus for use with a plurality of master plates each having an image formed thereon of information to be duplicated and for use with a medium for receiving the image on the master plates, including, a first feeder hopper for holding in a stacked condition the plates a first rotatable drum constructed to have a vacuum pressure established at its peripheral surface, means coupled to the first rotatable drum for establishing a vacuum pressure at the peripheral surface of the drum, transfer means disposed relative to the plates in the feeder hopper for obtaining an individual transfer of the master plates from said first feeder hopper to the peripheral surface of said drum to be transpotred by said drum, a second rotatable drum disposed relative to said first drum to contact the master plates transported thereby and constructed to receive impressions of the respective images on the plates on the first drum, a second feeder hopper for holding the medium, a third rotatable drum disposed in contiguous relation with said second drum and constructed to have a vacuum pressure established at its peripheral surface, a transfer mechanism operatively disposed relative to the medium in the second feeder hopper for obtaining a controlled transfer of such medium from said second feeder hopper to the peripheral surface of said third drum and for obtaining the transfer of the medium to the peripheral surface of the third drum in a particular time relationship for movement of the medium with said third drum into contact with said second drum to receive the impressions produced on said second drum, means including a stacking hopper disposed relative to the first drum for obtaining a transfer of the plates from the first drum to the stacking hopper after the transfer of the images on the plates to the second drum, and control means responsive to the transfer of the plates to the stacking hopper for obtaining a transfer of the plates from the stacking hopper to the first drum for recirculation of the plates by the first drum to the first feeder hopper and for transfer of the plates into the first feeder hopper.

References Cited in the file of this patent

UNITED STATES PATENTS

| | | |
|---|---|---|
| 1,287,610 | Barbieri et al. | Dec. 17, 1918 |
| 1,621,678 | Morse | Mar. 22, 1927 |
| 1,939,089 | Tauschek | Dec. 12, 1933 |
| 2,300,575 | Johnson | Nov. 3, 1942 |
| 2,412,527 | Mills | Dec. 10, 1946 |
| 2,483,203 | Janke | Sept. 27, 1949 |
| 2,528,123 | Dyken | Oct. 31, 1950 |
| 2,563,646 | Gruver | Aug. 7, 1951 |
| 2,572,450 | Crissy | Oct. 23, 1951 |
| 2,663,253 | Sauerman et al. | Dec. 22, 1953 |
| 2,766,685 | Sauerman | Oct. 16, 1956 |
| 2,770,186 | Ehrhard | Nov. 13, 1956 |
| 2,771,838 | Federwitz | Nov. 27, 1956 |